(12) United States Patent
Sánchez De La Fuente et al.

(10) Patent No.: US 11,962,812 B1
(45) Date of Patent: *Apr. 16, 2024

(54) VIDEO CODING USING A CODED PICTURE BUFFER

(71) Applicant: Fraunhofer-Gesellschaft zur Foerderung der angewandten Forschung e.V., Munich (DE)

(72) Inventors: Yago Sánchez De La Fuente, Berlin (DE); Benjamin Bross, Berlin (DE); Robert Skupin, Berlin (DE); Cornelius Hellge, Berlin (DE); Thomas Schierl, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,323

(22) Filed: May 18, 2023

Related U.S. Application Data

(63) Continuation of application No. 17/965,591, filed on Oct. 13, 2022, now Pat. No. 11,695,965.

(51) Int. Cl.
*H04N 19/91* (2014.01)
*H04N 19/109* (2014.01)

(52) U.S. Cl.
CPC ........... *H04N 19/91* (2014.11); *H04N 19/109* (2014.11)

(58) Field of Classification Search
CPC .............................. H04N 19/91; H04N 19/109
See application file for complete search history.

(56) References Cited

U.S. PATENT DOCUMENTS

| | | |
|---|---|---|
| 6,646,578 B1 | 11/2003 | Au |
| 7,599,435 B2 | 10/2009 | Marpe et al. |
| 10,003,815 B2 | 6/2018 | Ramasubramonian et al. |
| 11,695,965 B1* | 7/2023 | Sánchez De La Fuente ............... H04N 19/91 375/240.02 |
| 2006/0104356 A1 | 5/2006 | Crinon |
| 2006/0143678 A1 | 6/2006 | Chou et al. |
| 2008/0111721 A1 | 5/2008 | Reznik |

(Continued)

FOREIGN PATENT DOCUMENTS

| | | |
|---|---|---|
| AU | 2012332567 A1 | 5/2014 |
| AU | 2013244010 A1 | 10/2014 |

(Continued)

OTHER PUBLICATIONS

Bross, Benjamin, et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by teleconference, Oct. 7-16, 2020, published on Oct. 30, 2020, pp. 1-512.

(Continued)

*Primary Examiner* — Tracy Y. Li
(74) *Attorney, Agent, or Firm* — Perkins Coie LLP; Michael A. Glenn

(57) ABSTRACT

Interpolation between explicitly signaled CPB (or HRD) parameters at selected bit rates is used to achieve a good compromise between CPB parameter transmission capacity and CPB parametrization effectiveness and may be, particularly, made in an effective manner.

14 Claims, 11 Drawing Sheets

(56) References Cited

U.S. PATENT DOCUMENTS

| | | |
|---|---|---|
| 2009/0002379 A1 | 1/2009 | Baeza et al. |
| 2012/0307888 A1 | 12/2012 | Guo et al. |
| 2013/0107953 A1 | 5/2013 | Chen et al. |
| 2013/0266075 A1 | 10/2013 | Wang et al. |
| 2014/0036032 A1 | 2/2014 | Takahashi et al. |
| 2014/0079140 A1 | 3/2014 | Wang |
| 2014/0086332 A1 | 3/2014 | Wang |
| 2014/0086336 A1 | 3/2014 | Wang |
| 2014/0086342 A1 | 3/2014 | Wang |
| 2014/0192882 A1 | 7/2014 | Wang et al. |
| 2014/0355692 A1 | 12/2014 | Ramasubramanian et al. |
| 2021/0368183 A1 | 11/2021 | Deshpande |
| 2021/0392353 A1 | 12/2021 | Skupin et al. |
| 2022/0217374 A1 | 7/2022 | Wang |
| 2022/0264153 A1 | 8/2022 | Deshpande |
| 2023/0016439 A1 | 1/2023 | Deshpande |
| 2023/0095686 A1 | 3/2023 | Sánchez De La Fuente et al. |

FOREIGN PATENT DOCUMENTS

| | | | |
|---|---|---|---|
| AU | 2013283173 A1 | 1/2015 | |
| AU | 2013283173 A1 * | 1/2015 | ............ G06F 15/173 |
| AU | 2013317767 A1 | 3/2015 | |
| AU | 2013318467 A1 | 3/2015 | |
| CN | 101796834 A | 8/2010 | |
| CN | 104205849 A | 12/2014 | |
| CN | 104662919 A | 5/2015 | |
| CN | 104704840 A | 6/2015 | |
| CN | 104756495 A | 7/2015 | |
| CN | 104221387 B | 6/2018 | |
| CN | 105379273 B | 3/2019 | |
| CN | 113785584 A | 12/2021 | |
| CN | 114503547 A | 5/2022 | |
| EP | 2182732 A1 | 5/2010 | |
| JP | 7220223 B2 | 2/2023 | |
| KR | 20160016853 A | 2/2016 | |
| TW | 200820792 A | 5/2008 | |
| TW | 202032993 A | 9/2020 | |
| TW | 202130187 A | 8/2021 | |
| TW | 202228441 A | 7/2022 | |
| WO | 2013001796 A1 | 1/2013 | |
| WO | 2013009845 A2 | 1/2013 | |
| WO | 2013151635 A1 | 10/2013 | |
| WO | 2014050059 A1 | 4/2014 | |
| WO | 2014110651 A1 | 7/2014 | |
| WO | WO-2014110652 A1 * | 7/2014 | ............ H04N 19/13 |
| WO | 2020178126 A1 | 9/2020 | |
| WO | 2020188273 A1 | 9/2020 | |
| WO | 2020229734 A1 | 11/2020 | |
| WO | 2021033774 A1 | 2/2021 | |
| WO | 2021052832 A1 | 3/2021 | |
| WO | 2021237178 A1 | 11/2021 | |
| WO | 2022140160 A1 | 6/2022 | |

OTHER PUBLICATIONS

Sjoberg, Rickard, et al., "Overview of HEVC high-level syntax and reference picture management", IEEE Transactions on Circuits and Systems for Video Technology, Dec. 1, 2012 Institute of Electrical and Electronics Engineers, US—ISSN 1051-8215, vol. 22, Nr:12, XP055045360, pp. 1-14.

"Advanced video coding for generic audiovisual services", H.264 (Aug. 2021), ITU-T Standard H.264, International Telecommunication Union, Geneva, CH, No. H.264 (Aug. 2021), Aug. 22, 2021, pp. 1-844, XP044319496, Aug. 22, 2021, pp. 1-844. Uploaded in 4 parts.

Bross, Benjamin, et al., "Versatile Video Coding (Draft 10)", 19th JVET Meeting; Jun. 22, 2020-Jul. 1, 2020; Teleconference; (The Joint Video Exploration Team of ISO/IEC JTC1/SC29/WG11 and ITU-T SG.16); No. JVET-S2001, Sep. 4, 2020, XP030289618. Uploaded in 3 parts.

Hao, LV, et al., "A comparison of fractional-pel interpolation filters in HEVC and H.264/AVC", Visual Communications and Image Processing (VCIP), 2012 IEEE, IEEE, Nov. 27, 2012, pp. 1-6, XP032309181, pp. 1-6.

"Series H: Audiovisual and Multimedia Systems Infrastructure of audiovisual services—Coding of moving video", Recommendation ITU-T H.266 (Apr. 2022) Versatile video coding, ITU-T, Jul. 12, 2022, pp. 469-484, <URL:https://www.itu.int/rec/dologin_pub.asp?lang=e&id=T-REC-H.266-202204-I!!PDF-E&type=items>, Apr. 2022, pp. 469-484. Uploaded in 2 parts.

Sanchez, Yago, et al., "On HRD delivery schedule interpolation", Joint Video Experts Team (JVET) of ITU-T SG16 WP3 and ISO/IEC JTC1/SC29 28th Meeting, Mainz, DE, Oct. 20-28, 2022[JVET-AB0120-v1], JVET-AB0120 (version 1), ITU-T, Oct. 14, 2022, <URL:https://jvet-experts.org/doc_end_user/documents/28_Mainz/wg11/JVET-AB0120-v1.zip>: JVET-AB0120.docx: pp. 1-6, pp. 1-6.

Drugeon, Virginie, et al., "AHG9: DPB output time offsets for temporal sublayers", JVET-R0094, Joint Video Experts Team of ITU-T SG16 WP3 and ISO/IEC JTC 1/SC29/WG11, 18th meeting, 6 pp.

Skupin, Robert, et al., "AHG9: IRAP only HRD SEI message", JVET-T0066, Joint Video Experts Team of ITU-T SG 16 WP3 and ISO/IEC JTC1/SC29, 20th meeting, 15 pp.

* cited by examiner

VIDEO CODING USING A CODED PICTURE BUFFER

CROSS REFERENCE TO RELATED APPLICATIONS

This application is a Continuation of U.S. patent application Ser. No. 17/965,591 filed Oct. 13, 2022, which is incorporated herein by reference in its entirety.

TECHNICAL FIELD

The present application is concerned with video coding and the usage of a coded picture buffer in video coding.

BACKGROUND OF THE INVENTION

The hypothetical reference decoder and its use to check bitstream and decoder conformance is an essential component of every video coding standard, such as VVC.

In order to do such a conformance check, an HRD buffer model is specified consisting of a Hypothetical stream scheduler (HSS), a Coded Picture Buffer (CPB), a decoding process (which is considered instantaneous), a Decoded Picture Buffer (DBP) and an output cropping process is shown in FIG. 17.

The model defines the timing and bitrate with which the bitstream is fed into the coded picture buffer, the time at which its decoding unit (either Access Unit or VCL NAL unit in case of low delay operation mode) is removed from the CPB and decoded instantaneously, as well the output time at which the pictures are output from the DPB.

Only by doing so, it is also possible to define the CPB sizes required for a decoder to avoid buffer overflows (more data is sent to the decoder than what it can be kept into the CPB) or underflows (less data is sent to the decoder at a lower bitrate than required) and necessary data from AUs is not present at the decoder at the right time for decoding.

State-of-the-art video coding standards specify different parameters to describe a bitstream and HRD requirements and buffer models.

For instance, in HEVC, hrd_parameters are defined per sub-layer and describe one or more tuples of Bitrate(i) and CPBsize(i), which indicate that if the HSS feeds the CPB of size CPBsize(i) with a bitrate of Bitrate(i), no overflow or underflow will happen. In other words, continuous decoding can be guaranteed when these bitrate and CPB size tuples are obeyed.

In conjunction with the hrd_parameter syntax element, additional timing information is present in the bitstream that specifies the removal time of each Picture from the CPB, i.e., the information indicates at what time the VCL NAL units belonging to each picture are sent to decoding.

The relevant information is present in the Buffering Period SEI message with the syntax elements or variables InitialCPBRemovalDelay(i), InitialCPBRemovalDelayOffset(i) and AuCPBRemovalDelay and in the Picture Timing SEI message with AuCPBRemovalDelay.

However, depending on the application and the transmission channel, there would be a need for information on the HRD parameters for many bit rates in order to be able to fine-tune in terms of bitrate. This would require, however, a bit-consuming transmission of a high number of HRD parameters for a dense selection of bitrates(i). It would be favorable to have a concept at hand which allows a correct HRD parametrization, i.e., one not leading to underflow or overflow of the CPB, for a high number of bit rates at a reasonable overhead for transmitting the HRD information.

SUMMARY

It is, accordingly, the object of the present invention to provide a video codec using a coded picture buffer operation which yields a better tradeoff between bit consumption for HRD signalization on the one hand and an effective way of determination of HRD parameters for many bit rate scenarios.

An embodiment may have an apparatus for video decoding, the apparatus having a coded picture buffer and a decoded picture buffer (DPB), configured to receive a data stream having pictures of a video encoded thereinto along a coding order as a sequence of access units, feed the sequence of access units sequentially into the CPB using a selected bitrate with halting the feeding with respect to access units for which a virtual time of availability according to a temporal frame removal raster preponed by, for a first access unit in the coding order, a selected temporal removal delay and, for subsequent access units in coding order, a sum of the selected temporal removal delay and a selected temporal offset has not yet been reached, until the virtual time of availability is reached; remove the AUs from the CPB AU-wise using the temporal raster [RemovalTime], extract from the data stream first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate, determine the selected temporal offset by interpolating, at the selected bitrate, between the predetermined temporal offset indicated by the first CPB parameters and the predetermined temporal offset indicated by the second CPB parameters and the selected temporal removal delay by interpolating, at the selected bitrate, between the predetermined temporal removal delay indicated by the first CPB parameters and the predetermined temporal removal delay indicated by the second CPB parameters, decode a current AU removed from the CPB using inter-picture prediction from a referenced reference picture stored in the DPB to acquire a decoded picture, and insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a FIFO strategy, from the DPB, if the DPB mode information indicates a second mode, read memory management control information having at least one command in the current AU and execute the at least one command so as to change the classification assigned to at least one of the reference pictures stored in the DPB, and use the classification of the reference pictures in the DPB, for managing reference picture removal from the DPB.

Another embodiment may have an apparatus for encoding a video into a data stream wherein the data stream is ought to be decoded by being fed to a decoder having a coded picture buffer (CPB), the apparatus configured to encode, into a data stream, pictures of a video encoded in a coding order as a sequence of access units (AU), determine first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate, and perform the determining such that interpolating between the predetermined temporal offset of the first CPB parameters and the predetermined temporal offset of second CPB parameters at each of a plurality of selected bitrates yields an interpolated temporal offset and an interpolated temporal removal delay so that feeding the data stream to the decoder via the CPB by feeding the sequence of AUs sequentially into the CPB using the respective selected bitrate with halting the feeding with respect to access units for which a virtual time of availability according to a temporal frame removal raster preponed by, for a first access unit in the coding order, an interpolated temporal removal delay and, for subsequent access units in coding order, a sum of the interpolated temporal removal delay and an interpolated temporal offset has not yet been reached, until the virtual time of availability is reached; removing the AUs from the CPB AU-wise using the temporal raster, does not lead to any underflow and any overflow, and encode the CPB parameters into the data stream, wherein the apparatus is configured to, in encoding the AUs, encode a current picture using inter-picture prediction from a referenced reference picture stored in a DPB into a current AU, and insert a decoded version of the current picture in the DPB into the DPB, assign to each reference picture stored in the DPB a classification as one of a short-term reference picture, a long-term reference picture and an unused-for-reference picture, write DPB mode information into the current AU, if the DPB mode information indicates a first mode, remove one or more reference pictures classified as a short-term picture, according to a FIFO strategy, from the DPB, if the DPB mode information indicates a second mode, write memory management control information having at least one command into the current AU, the command being instructive to change the classification assigned to at least one of the reference pictures stored in the DPB, wherein the classification of the reference pictures in the DPB, is used for managing reference picture removal from the DPB.

According to another embodiment, a method for video decoding by use of a coded picture buffer and a decoded picture buffer (DPB) may have the steps of: receiving a data stream having pictures of a video encoded thereinto along a coding order as a sequence of access units, feeding the sequence of access units sequentially into the CPB using a selected bitrate with halting the feeding with respect to access units for which a virtual time of availability according to a temporal frame removal raster preponed by, for a first access unit in the coding order, a selected temporal removal delay and, for subsequent access units in coding order, a sum of the selected temporal removal delay and a selected temporal offset has not yet been reached, until the virtual time of availability is reached; removing the AUs from the CPB AU-wise using the temporal raster [RemovalTime], extracting from the data stream first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate, determining the selected temporal offset by interpolating, at the selected bitrate, between the predetermined temporal offset indicated by the first CPB parameters and the predetermined temporal offset indicated by the second CPB parameters and the selected temporal removal delay by interpolating, at the selected bitrate, between the predetermined temporal removal delay indicated by the first CPB parameters and the predetermined temporal removal delay indicated by the second CPB parameters, decoding a current AU removed from the CPB using inter-picture prediction from a referenced reference picture stored in the DPB to acquire a decoded picture, and inserting the decoded picture into the DPB, assigning to each reference picture stored in the DPB a classification as one of a short-term reference picture, a long-term reference picture and an unused-for-reference picture, reading DPB mode information from the current AU, if the DPB mode information indicates a first mode, remove one or more reference pictures classified as a short-term picture, according to a FIFO strategy, from the DPB, if the DPB mode information indicates a second mode, reading memory management control information having at least one command in the current AU and execute the at least one command so as to change the classification assigned to at least one of the reference pictures stored in the DPB, and use the classification of the reference pictures in the DPB, for managing reference picture removal from the DPB.

Another embodiment may have a data stream into which video is encoded and which has first and second CPB parameters so that the above inventive method leads to no CPB overflow and underflow.

An idea underlying the present invention is that interpolation between explicitly signaled CPB (or HRD) parameters at selected bit rates may be used to achieve a good compromise between CPB parameter transmission capacity and CPB parametrization effectiveness and may be, particularly, made in an effective manner, i.e., in a manner leading to a safe and correct CPB operation without underflow and overflow and a manner according to which, for instance, the CPB size indicated by the explicitly signaled CPB parameters does not have to be provided with a safety offset to account for interpolation-related inadvertent circumstances even if the explicitly signaled CPB parameters are indicative of, in addition to the CPB size and the bit rate for the explicitly signaled operation points, a predetermined temporal offset and a predetermined temporal removal delay for these operation points. In particular, according to the idea, at the decoding side, both the temporal offset and the temporal removal delay for a selected bitrate may be determined by interpolating, at the selected bitrate, between the corresponding values for this offset and delay according to the signaled CPB parameters. Such an interpolated/selected temporal offset may then be used to feed a sequence of access units of the video data stream sequentially into the coded picture buffer using the selected bit rate, namely by halting the feeding with respect to access units for which a virtual time of availability according to a temporal frame removal raster, preponed by, for a first access unit in the coding order, the selected/interpolated temporal removal delay and, for subsequent access units in coding order, a sum of the selected temporal removal delay and the selected/interpolated temporal offset has not yet been reached, until the virtual time of availability is reached. Using the temporal raster, the access units may then be removed from the coded picture buffer. While, at decoding side, merely the interpolation has to be performed to determine the selected temporal offset and the selected temporal removal delay, the encoder sets the explicitly signaled CPB parameters relating to the operation points for which the video data stream is explicitly prepared, in a manner taking into account the interpolation, i.e., in a manner so that the corresponding selected/interpolated values for temporal offset and temporal removal delay do not lead to an underflow or overflow according to the CPB parameters of the operation points.

BRIEF DESCRIPTION OF THE DRAWINGS

Embodiments of the present application are described below with respect to the figures among which.

DETAILED DESCRIPTION OF THE INVENTION

Before resuming the description of the introductory portion of the specification and illustrating the issues involved with the wish of providing of high flexibility in terms of operation points with respect to HRD operation, preliminary, examples for a video codec are provided into which the subsequently described embodiments could be built. It should be noted, however, that these examples for a video codec should not be treated as limiting the subsequently explained embodiments of the present application.

Figure 1:
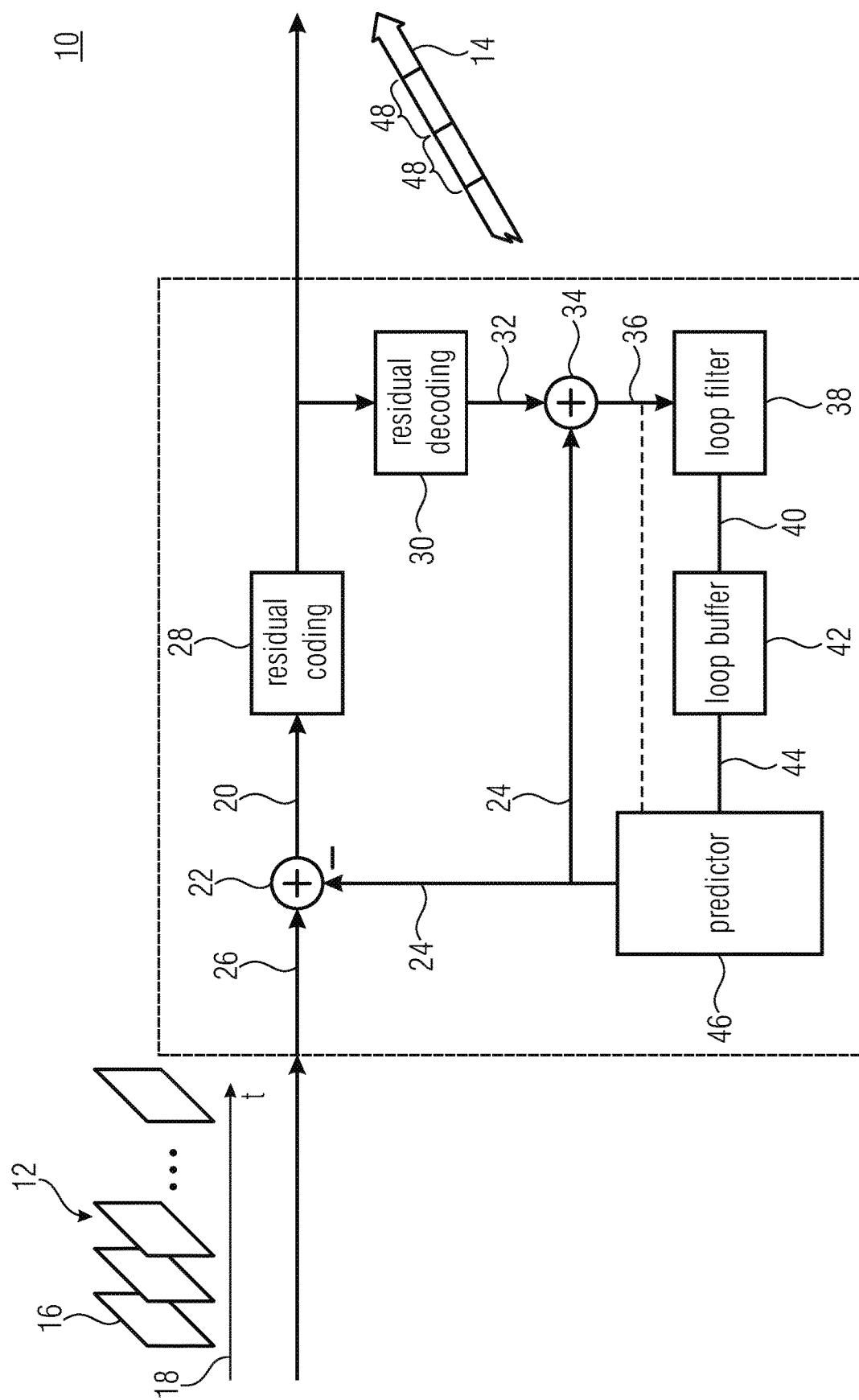
FIG. 1 shows a block diagram of a possible implementation of an encoder according to which embodiments of the present application might be implemented.

FIG. 1 shows an encoder 10 configured to encode a video 12 into a bitstream 14. The encoder 10 encodes pictures 16 of video 12 into bitstream 14 using a picture coding order which may differ from a presentation time order 18 at which pictures 16 are sequentially presented or output when presenting video 12. FIG. 1 also shows a possible implementation of encoder 10, but it is again noted that the details set out with respect to FIG. 1 are not limiting the embodiments of the present application described in more detail below. Although subsequently applied, the encoding of encoder 10 may not involve intra prediction, may not involve inter-prediction, may not operate blockwise, may not use transform residual coding, may operate lossy or lossfree or combinations thereof.

Encoder 10 of FIG. 1 performs the encoding by use of prediction. In a block-wise manner, encoder 10 predicts a current picture, or more precisely, a currently encoded portion of this picture, and forms a prediction residual 20 by subtracting at a subtractor 22 a prediction signal 24 from the original version of the current picture 26. A residual coder 28 then encodes the prediction residual 20 into bitstream 14, wherein the residual coding may be lossy and may, for instance, involve subjecting the residual signal 20 to a transformation into a transform domain and entropy coding of the transform coefficients resulting from the transformation. In order to obtain the prediction signal 24 on the basis of the reconstructable version of the already encoded portions of video 12, a residual decoder 30 reverses the residual coding and yields from the transform coefficients, by reverse transformation, a residual signal 32 which differs from residual signal 20 by the loss introduced by residual coder 28. In order to reconstruct the current picture or, to be more precise, a currently encoded block of the current picture, the residual signal 32 is added to prediction signal 24 by an adder 34 so as to yield a reconstructed signal 36. Optionally, a loop filter 38 subjects the reconstructed signal 38 to some loop filtering and the filtered signal 40 is entered into a loop buffer 42. The loop buffer 42 buffers, accordingly, reconstructed versions of already coded pictures and reconstructed portions of the current picture, respectively. Based on these reconstructed versions 44 and, optionally, based on an unfiltered reconstructed version 36 of the already coded portions of the current picture, a prediction stage 46 determines the prediction signal 24.

The encoder 10 performs many coding decisions using rate distortion optimization. For instance, predictor 46 selects one of several coding modes including, for instance, one or more inter-prediction modes and one or more intra-predication modes and, optionally, combinations thereof at a granularity of coding blocks. At a granularity of these coding blocks or, alternatively, at a granularity of prediction blocks into which these coding blocks are further sub-divided, predictor 46 determines prediction parameters fitting to the selected prediction mode such as one or more motion vectors for inter-predicted blocks, or intra prediction modes for intra-predicted blocks. The residual coder 28 performs the residual coding at a granularity of residual blocks which, optionally, may coincide with any of the coding blocks or prediction blocks, or may be a further subdivision of any of the these blocks or may result from another, independent subdivision of the current picture into the residual blocks. Even the aforementioned subdivision is determined by encoder 10. These coding decisions, i.e., subdivision information, prediction modes, prediction parameters and residual data, is coded by encoder 10 into bitstream 14 using, for instance, entropy coding.

Each picture 16 is encoded by encoder 10 into a contiguous portion 48 of bitstream 14, called access unit. Thus, the sequence of access units 48 in bitstream 14 has the pictures 16 sequentially encoded thereinto, namely along the aforementioned picture coding order.

Figure 2:
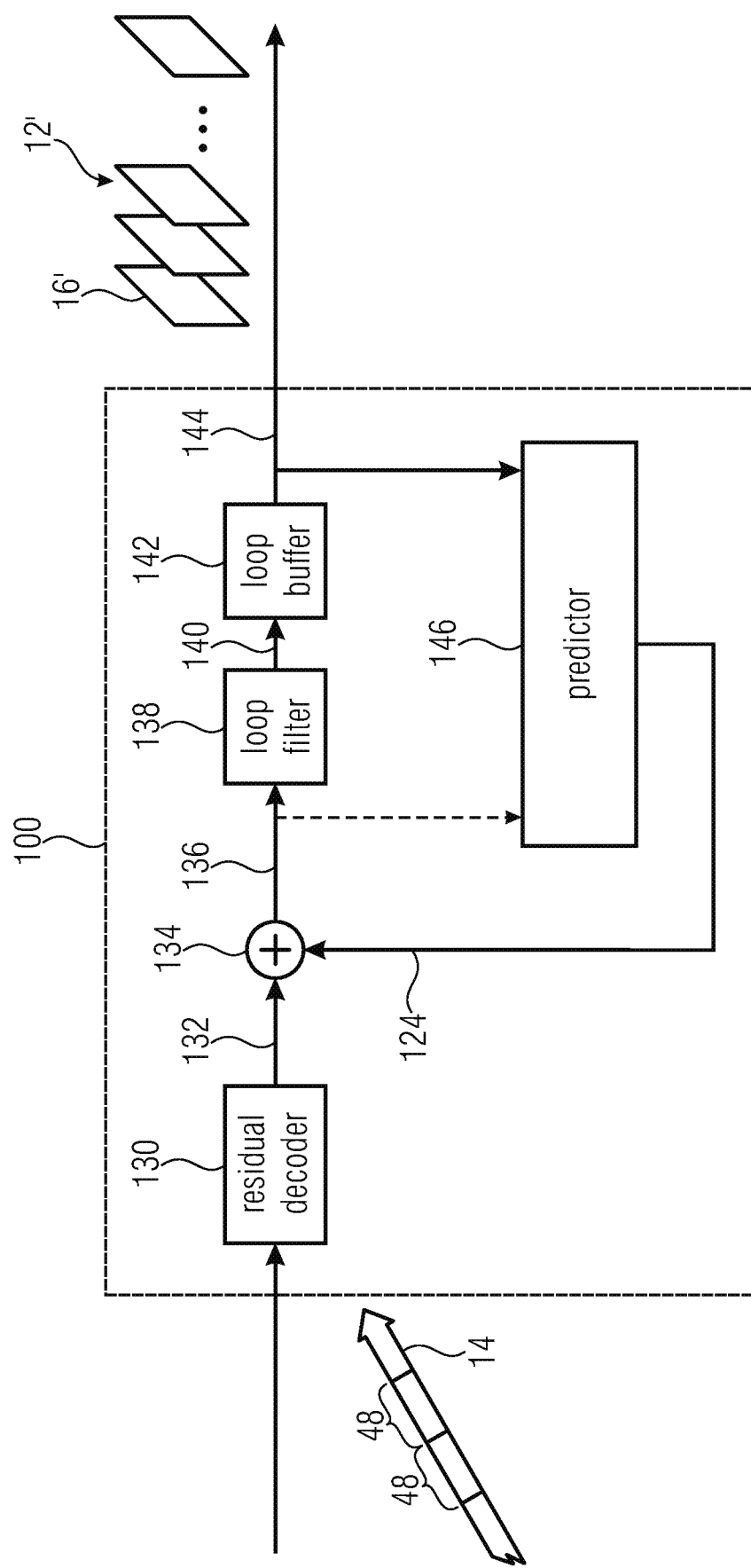
FIG. 2 shows a block diagram of a possible implementation of a decoder according to which embodiments of the present application might be implemented, and the decoder fitting to the encoder of FIG. 1.

FIG. 2 shows a decoder 100 fitting to the encoder 10 of FIG. 1. The decoder 100 decodes from bitstream 14 a reconstructed version 12' of the video 12 of FIG. 1 by decoding, from each access unit 48, the corresponding picture 16' of video 12'. To this end, decoder 100 is internally construed like the reconstruction part of the prediction loop of encoder 10 of FIG. 1. That is, decoder 100 comprises a residual decoder 130 which reconstructs the residual signal 32 from bitstream 14. The prediction signal 124 is added to this residual signal 132 at adder 134 to yield the reconstructed signal 136. The optional loop filter 138 filters the reconstructed signal 136 to yield the filtered reconstructed signal 140 which is then buffered in loop buffer 142. From this buffer, the buffered and filtered reconstructed signal 144 is output by decoder 100, i.e., the buffered and reconstructed signal contains the reconstructed pictures 16' and from the buffer 142 these pictures 16' are output in presentation time order. Further, the predictor or prediction unit 146 performs the prediction based on signal 144 and, optionally, reconstructed signal 136 to yield the prediction signal 124. The decoder obtains all necessary information for decoding and determined by encoder 10 using rate/distortion optimization from bitstream 14 such as the subdivision information, prediction mode decision, prediction parameters and residual data such as using entropy decoding. The residual data may comprise, as discussed above, transform coefficients.

The encoder 10 may perform its encoding task in a manner so that, on average, the video 12 is encoded in bitstream 14 at a certain bit rate, i.e., so that the pictures 16 are, on average, coded into bitstream 14 using a certain number of bits. However, due to different picture content complexity, changing scene content and differently coded pictures such as I frames, P frames and B frames, the number of bits spent in bitstream 14 for each picture 16 may vary. That is, the size or number of bits of each access unit 48 may vary. In order to guarantee for an interrupt-free play-out of video 12' at decoder 100, the encoder 10 provides bitstream 14 with CPB parameters. These CPB parameters guarantee such an interrupt free or problem-free decoding by decoder 100 provided the decoder 100 is fed via a decoded picture buffer 200 in a certain pre-defined manner. That is, the CPB parameters refer to an apparatus shown in FIG. 3, where a feeder 202 feeds a decoder 100 via a coded picture buffer 200, the feeder 202 receiving bitstream 14 and feeding the decoder 100 with the bitstream 14 via a coded picture buffer 200 so that decoder 100, in turn, has access to the access units 48 of bitstream 14 in time so that the pictures 16' of video 12' may be output in presentation time order interrupt-free.

The CPB parameters are written into bitstream 14 by encoder 10 for several so-called operation points $OP_i$. Each operation point $OP_i$ refers to a different bit rate (i) at which feeder 202 feeds the bitstream 14, i.e., the sequence of access units 48, into the coded picture buffer 200. That is, for each operation point $OP_i$ the CPB parameters 300 indicate the bit rate for which they apply. Further, they indicate a coded picture buffer size for coded picture buffer 200 which suffices to encompass the fullest state when feeding decoder 100 at the corresponding bit rate. Further, the information indicated by the CPB parameters $300_i$, is indicative of a temporal delay at which, relative to a point in time where a first bit of bitstream 14 is entered into the coded picture buffer 200, a first access unit is removed from the coded picture buffer 200 and passed on to decoder 100, respectively. The term first may refer to the picture coding order and to a certain buffer period, i.e. a subsequence of pictures. Further, the CPB parameters $300_i$ indicate a temporal offset at which a feeding of following access units, following the aforementioned first access unit, are allowed to be fed into the decoded picture buffer 200 prior to their regular feeding determined by a regular temporal raster, delayed by the aforementioned temporal delay. Not shown in FIG. 4, but optionally, the CPB parameters $300_i$ indicate further information such as information which reveals or indicates or allows to derive therefrom, the just mentioned temporal raster at which the bitstream 14 is, access unit-wise, removed from coded picture buffer 200 to be subject to decoding by decoder 100, the temporal raster being, as just mentioned, delayed by the temporal delay. The temporal raster is, accordingly, related to the frame rate of video 12 so as to allow for a recovery of pictures 16' by decoder 100 at a rate which suffices to output these pictures 16' at this frame rate. The optional indication of the temporal raster may be common to all operation points and indicated in the bitstream commonly for same. Further, instead of signaling any information on the temporal raster, this information may by fixed and known the encoder and decoder beforehand.

Figure 4:
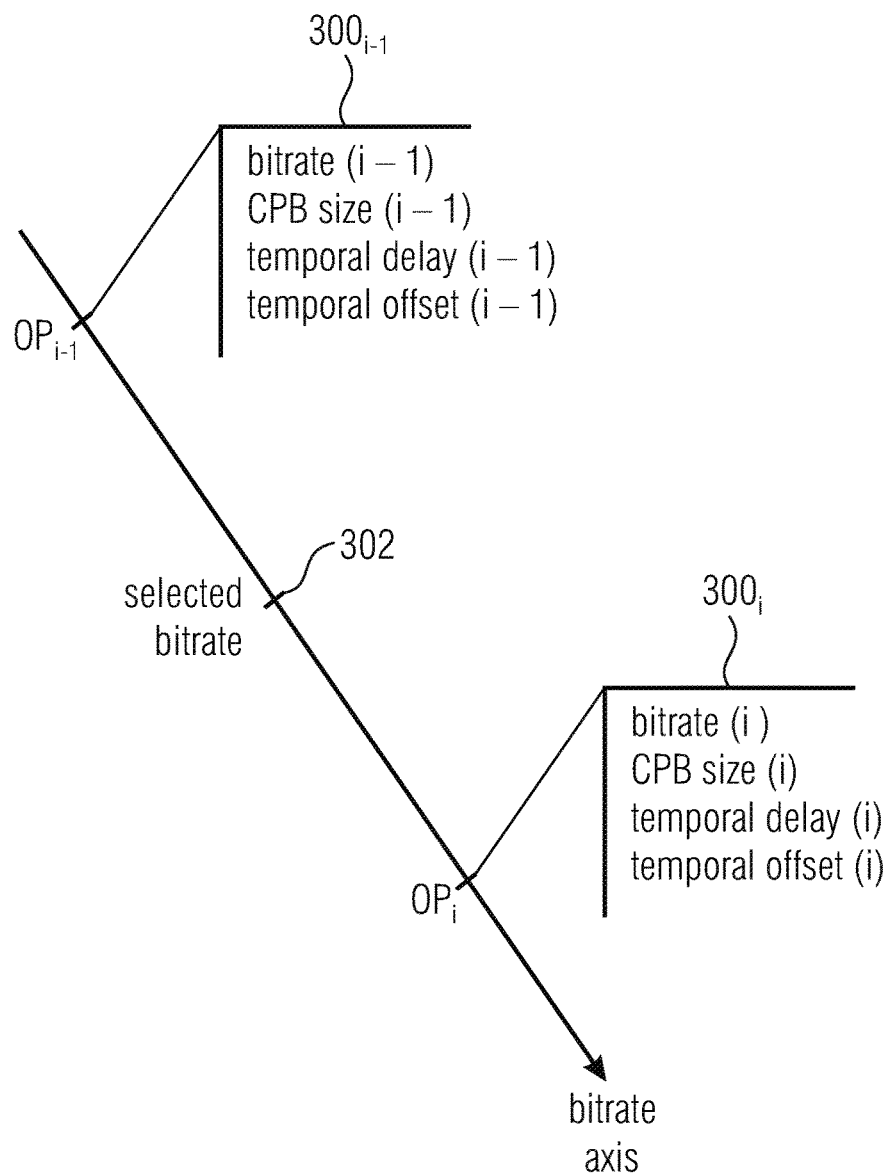
FIG. 4 shows a schematic diagram of CPB parameter coding and interpolating therebetween.

FIG. 4 illustrates the CPB parameters $300_i$ for two operation points $OP_i$, i.e., two operation points $OP_{i-1}$, and $OP_i$ referring to two different bit rates and CPB sizes. For the bit rates between these bitrates bitrate(i−1) and bitrate(i), there exists no further instantiation of such CPB parameters in bitstream 14. As already indicated above, the embodiments of the present application are to fill this gap by the possibility to derive such missing instantiation of CPB parameters for some selected bit rate between bitrate(i−1) and bitrate(i) by means of interpolation.

Note that due to the fact that the aforementioned temporal raster is related to the frame rate, the encoder 10 may indicate this temporal raster or the information thereon only once commonly for all CPB parameters or all instantiations of the CPB parameters or, in even other words, commonly for all operation points. Further, even no information might be conveyed in the data stream with respect to the temporal raster, with a temporal raster then being known between encoder and decoder beforehand such as, for instance, due to pre-knowledge between encoder and decoder on a predetermined frame rate of video 12 and 12', respectively, and a certain group of pictures (GOP) structure and relationship between picture coding order on the one hand and presentation time order 18 on the other hand.

The description of the introductory portion of the specification is now resumed. As indicated above, CPB parameters may be conveyed by SEI messages. The InitialCPBRemovalDelay corresponds to the temporal delay of FIG. 4 and the InitialCPBRemovalDelayOffset corresponds to the temporal offset of FIG. 4. The AuCPBRemovalDelay indicates the temporal raster, i.e. the temporal distances between the removal of consecutive AUs from the DPB. As explained, the CPB parameters of FIG. 4 may be conveyed in a buffering period SEI message indicative of the correct scheduling for the feeding of the decoder 100 via the coded picture buffer 200 for a so-called buffering period, i.e., a sequence of pictures of the video corresponding to a certain sequence of access units including a first access unit of this buffering period and following access units.

As explained in the introductory portion of the specification, CPB parameters are already known to be transferred in a bitstream, but they refer to certain specific bit rates.

For the most basic operation only InitialCPBRemovalDelay(i) and AuCPBRemovalDelay are used.

In that case, the first access unit that is decoded is a Random Access Point with its corresponding Buffering Period SEI message and time 0 is defined as the time at which the first bit of the Random Access Point enters the CPB. Then at time InitialCPBRemovalDelay(i) the picture corresponding to the Random Access Point is removed from the CPB. For further non-RAP pictures, the removal of the CPB happens at InitialCPBRevovalDelay(i)+AuCPBRemovalDelay (legacy codecs may define some additional parameters to convert the indicated delay to time delta, i.e. ClockTick, but this is here ignored for simplification).

When the next RAP comes, the removal time is computed as before for non-RAP pictures, i.e., InitialCPBRevovalDelay(i)+AuCPBRemovalDelay and this new value is used as anchor for further deltas up to another RAP, i.e. anchorTime=InitialCPBRemovalDelay(i)+AuCPBRemovalDelay and then removal of pictures becomes anchorTime+AuCPBRemovalDelay and the anchorTime is updated at the next RAP with a Buffering SEI message, anchorTime=anchorTime+AuCPBRemovalDelay and so forth.

In other words, the RemovalTime of the very first access unit that initializes the decoder (an AU having a Buffering Period SEI) is computed as:

RemovalTime[0]=InitialCPBRemovalDelay($i$)

Note that InitialCPBRemovalDelay can be derived from the bitstream as initial_cpb_removal_delay[i]÷90000.

The RemovalTime of an AU that is not the first access unit that initializes the decoder but is an AU that is the first of another buffering period (i.e., an AU having a buffering period SEI message that is not the very first AU that initializes the decoder) is computed as:

RemovalTime[$n$]=RemovalTime[$n_b$]+AuCPBRemovalDelay where $n_b$ is the index that refers to the first AU of the previous buffering period (the AU preceding the current AU that also has a buffering period SEI message) and AuCPBRemovalDelay can be derived from the bitstream as $t_c$*cpb_removal_delay(n) and $t_c$ is the clockTicks (units in which the cpb_removal_delay syntax is given to convert the given value into time).

The RemovalTime of an AU that is neither the first access unit that initializes the decoder nor is an AU that is the first of another buffering period (i.e., an AU having a buffering period SEI message that is not the very first AU that initializes the decoder) is computed as:

RemovalTime[$n$]=RemovalTime[$n_b$]+AuCPBRemovalDelay where $n_b$ is the index that refers to the first AU of the current buffering period (the AU preceding the current AU that has a buffering period SEI message) and AuCPBRemovalDelay can be derived from the bitstream as $t_c$*cpb_removal_delay(n) and $t_c$ is the clockTicks (units in which the cpb_removal_delay syntax is given to convert the given value into time).

A drawback of the described model is that the defined InitialCPBRemovalDelay implicitly sets a limit on the CPB size that is available/usable. Thus, in order to make use of the CPB buffer, a large time delay for the removal of the first Access Unit (InitialCPBRemovalDelay) would be entailed. In fact, assuming that the encoded pictures at the decoder are transmitted as soon as they are encoded, every picture would arrive at the decoder no earlier than at time:

initArrivalEarliestTime[$n$]=RemovalTime[$n$]+InitCpbRemovalDelay($i$)

I.e., its removal time minus the InitialCPBRemovalDelay, which is the time that the decoder waited to remove the first AU since receiving the respective first bit of this AU in the CPB.

Or in case the picture previous to the current picture is so large that its last bit arrives (AuFinalArrivalTime[n−1]) later than RemovalTime[n]−InitCpbRemovalDelay(i), the initial arrival time (time at which the first bit of the current picture is fed into the CPB) is equal to:

initArrivalTime[$n$]=Max(AuFinalArrivalTime[$n$−1], initArrivalEarliestTime[$n$])

This means for instance that if an AU following with a new buffering period SEI message cannot enter the CPB earlier than InitialCPBRemovalDelay(i) of its removal time, it is not possible to achieve a $CPB_B$ that is bigger than $CPB_A$, since feeding the CPB with Bitrate(i) during InitialCPBRemovalDelay(i) only achieves a CPB fullness of $CPB_A$.

Figure 5:
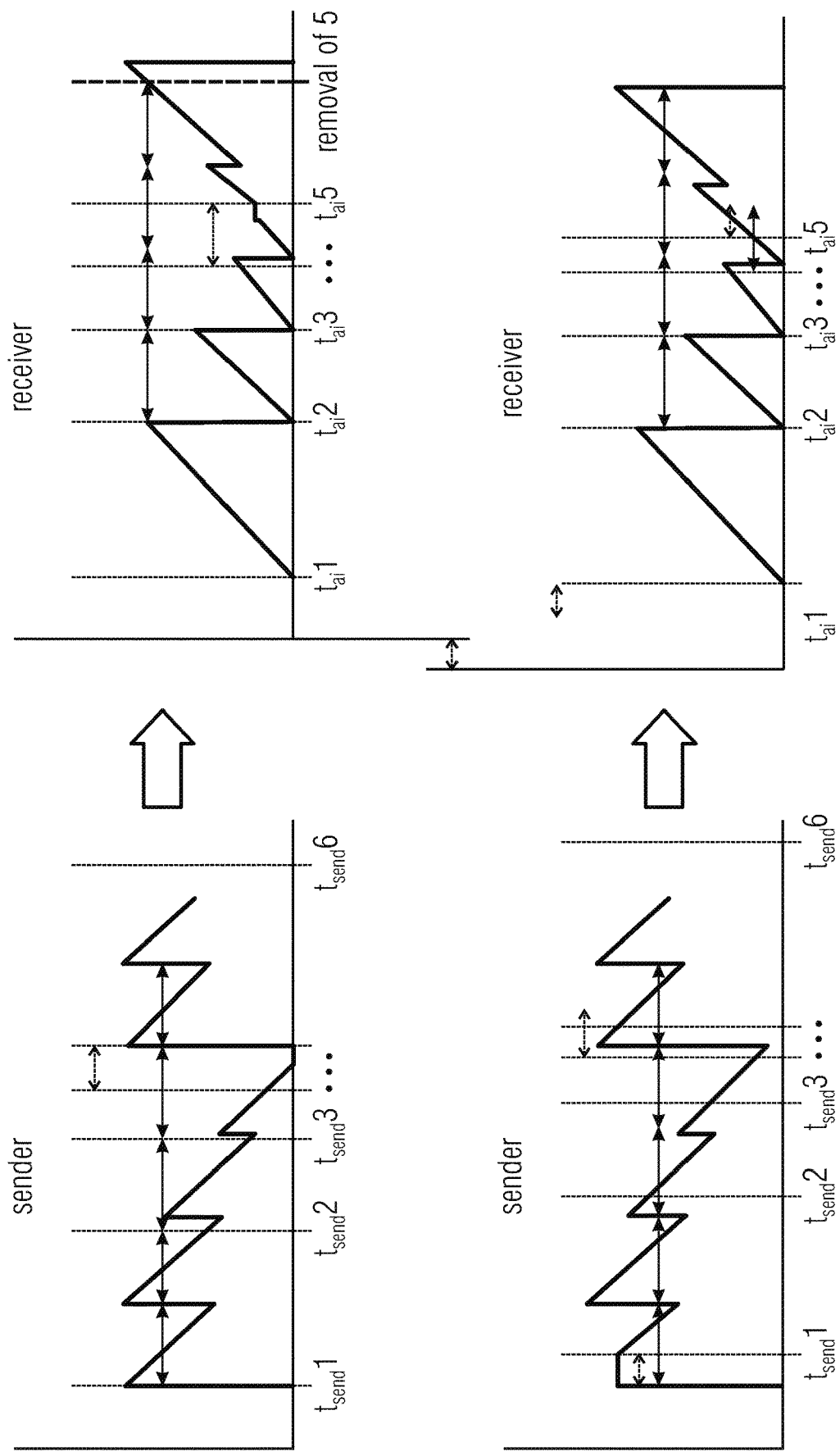
FIG. 5 shows on the left hand side graphs of a fill state of a feeder of the CPB and the right hand side graphs of a fill state of the CPB with the upper half showing an example without usage of temporal offset for following, non-first access units, and the lower half showing an example with usage of temporal offset for following, non-first access units.

To solve this issue, the idea is that a hypothetical sender (or the HSS in the FIG. 17 or the feeder 202 in FIG. 4) delays the scheduling of the first RAP with a buffering SEI message with a given time offset InitialCPBRemovalDelayOffset(i) as shown in FIG. 5.

Figure 3:
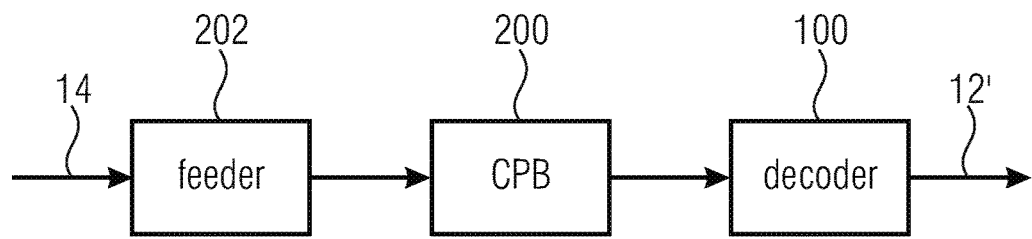
FIG. 3 shows a block diagram of an apparatus for decoding according to an embodiment of the present application.
Figure 17:
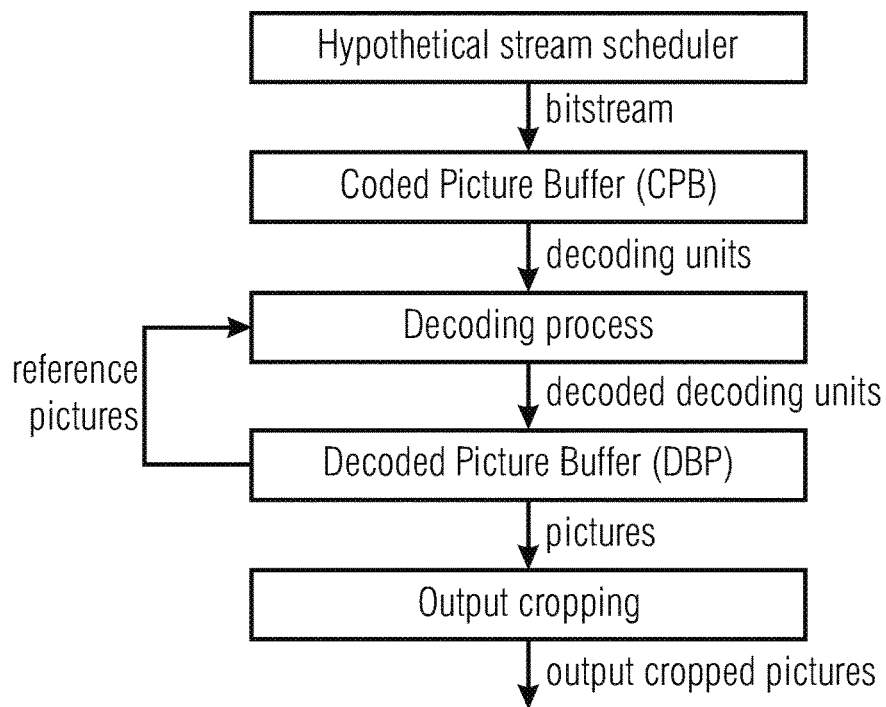
FIG. 17 shows a block diagram of a known HRD buffer model.

That is, the upper part of FIG. 5 shows on the left-hand side a feeding of the coded picture buffer 200 by way of virtual buffer fullness of the HSS of FIG. 17 or feeder 202 of FIG. 3 with assuming that this "sender" obtains the access units at the aforementioned removal raster instantaneously, wherein the sender sends-out the sequence of access units sequentially into the coded picture buffer using a certain bit rate which is derivable from the slope of the graph. The right-hand side shows the receiver side, and, to be more precise, shows the CPB fullness revealing the feeding of AUs into the CPB and the removal of access units from the coded picture buffer. The removals occur instantaneously, the feeding at the certain bitrate. The bitrate is, again, derivable from the slope of the right-hand side graph. The trailing edges in this graph indicate the instances at which the sequence of access units are, access unit-wise, removed from the CPB and input into the decoder. They occur at the temporal raster delayed, however, by the time delay at the beginning between the arrival at the first bit of the first access unit Taii and the first falling edge indicating its removal.

The lower half of FIG. 5 shows the effect of having the temporal offset: The available or useable CPB size is not restricted by the amount determined by the temporal delay for removing the first access unit. Rather, the temporal offset enables to feed following access units, following the first access unit, at time instances prior to the temporal raster preponed by the temporal removal delay, namely at a maximum of a temporal advance time of the temporal offset. Here, in the example of FIG. 5, it is, accordingly, possible for the feeding to resume the feeding with a fifth access unit immediately after the fourth access unit without having to wait or halting the feeding until the time for this fifth access unit according to the temporal raster preponed by only the temporal delay is reached.

With that, scheduling changes to the following initArrivalEarliestTime[$n$]=RemovalTime[$n$]−InitCpbRemovalDelay($i$)−InitialCPBRemovalDelayOffset($i$)

which means that the CPB size of $CPB_B$ that is larger than $CPB_A$ could correspond to a size that is achieved by feeding the CPB with Bitrate(i) for InitCpbRemovalDelay(i)+InitialCPBRemovalDelayOffset(i).

Summarizing the working principle described before, there are two types of frames in terms of how the initArrivalEarliestTime is computed. For the first picture (or access unit) in a buffering period (i.e. a buffering period is defined as the period from an AU with a Buffering Period SEI message until the next AU carrying a Buffering Period SEI message) the initArrivalEarliestTime is computed as its RemovalTime minus InitCpbRemovalDelay. For any other AU not being the first AU within a buffering period (i.e. AU not carrying a Buffering Period SEI message) the InitArrivalEarliestTime is computed as its RemovalTime minus InitCpbRemovalDelay minus InitialCPBRemovalDelayOffset.

The encoder typically sends a bitstream with a single value or a couple of values, called scheduling options, with parameters related to HRD operation. For instance, different Rate values with which the decoder operates its CPB, i.e. the rates at which the CPB can be fed.

However, there might be scenarios in which it is desirable to use a different rate. For instance when the channel transmits the data to the decoder at bursts, sending the data (as long as any is available) at high bitrates, while using the channel for sending other data when there is not video data to send.

In order to cope with this, computation of the HRD or CPB parameters is necessary by means of some kind of fitting, which could be a piece-wise linear fitting/regression.

For instance, let's assume that there are two sets of parameters corresponding to two rates $R_0$ and $R_1$ with $R_0<R_1$ such as illustrated at $300_{i-1}$ in FIG. 4. And let us assume that $R_{sel}$ is selected so that it lies within $R_0$ and $R_1$ and corresponds to a value equal to the sum of 90% $R_0$ and 10% $R_1$. Values like CPB size for such a rate can be similarly computed by using the same formula, i.e. in the case of the example a linear fitting where the new CPB size is equal to the sum of 90% $CPB_0$ and 10% $CPB_1$.

However, when it comes to the offset that determines the earliest arrival time of each picture, i.e. InitialCPBRemovalDelayOffset, the same computation cannot be done. There are different reasons for that as follows:
1) The buffer fullness (for which CPB size is a definitive limit) is influenced together by the used feeding rate and the InitialCPBRemovalDelayOffset so a linear fitting of the InitialCPBRemovalDelayOffset values does not work.
2) The actual initial arrival time is not the earliest possible but the maximum between the final arrival time of the previous access unit and the earliest possible arrival time, i.e., initArrivalTime[n]=Max(AuFinalArrivalTime[n−1], initArrivalEarliestTime[n])

Therefore, at each access unit, the additional data that is fed into the buffer due to a InitialCPBRemovalDelayOffset is proportional to Max(initArrivalTime[n]−AuFinalArrivalTime[n−1], 0).

This issue could become even more complex to compute when the fitting to compute operation points that are not signalled in the discrete parameters does not follow a piecewise linear fitting but a more complex fitting such as cubic or polynomial fitting.

Thus, in accordance with embodiments of the present application, the reception side may rely on a problem-free mode of operation, i.e., one without underflow and overflow, when managing the feeding and emptying of the coded picture buffer 200 using interpolation between the operation points including an interpolated version between the temporal offset indicated by one operation point and the temporal offset indicated by the other operation point. The encoder takes care that the resulting interpolated values result into no buffer issues.

That is, the apparatus of FIG. 3 would, according to an embodiment, operate as follows. The apparatus would receive the bitstream 14 as the sequence of access units 48. The feeder 202 would feed the sequence of access units sequentially into the coded buffer 200 using a selected bit rate 302 which lies somewhere between the bitrate(i−1) of one operation point $OP_{i-1}$ and bitrate(i) of another operation point $OP_i$ for which CPB parameters $300_{i-1}$ and $300_i$ are written into bitstream 14 by the encoder 10 of FIG. 1. Feeder 200 feeds, however, the coded picture buffer 200 not continuously at the selected bit rate but may halt or stop the feeding with respect to certain access units. In particular, feeder 202 stops or halts the feeding with respect to any access unit for which a virtual time of availability, called InitArrivalEarliestTime in the preceding description, as defined by the temporal removal raster preponed by, for a first access unit in the picture coding order, an interpolated temporal removal delay and, for following access units in the picture coding order, a sum of the interpolated temporal removal delay and an interpolated temporal offset has not yet been reached, until this virtual time of availability is reached. Again, due to the difference in computing these times, access units which are not the first access unit, may stay longer in the coded picture buffer 200 than compared to the first access unit. If, for instance, for a certain access unit, the temporal removal raster indicates removal time $t_{removal}$, but $t_{removal}$ minus the interpolated temporal removal delay (in case of the access unit being the first access unit) or $t_{removal}$ minus the sum of interpolated temporal removal delay and (plus) the interpolated temporal offset (in case of the access unit being a following access unit, but not the first access unit) has not yet been reached, the feeding of this access unit into the coded picture buffer 200 is delayed until this time is reached. In the above description, InitArrivalEarliestTime in the preceding description, the halting or stopping is embodied by the max function discussed above, InitialCPBRemovalDelayOffset was used to indicate the temporal offset and the temporal raster is defined by the array RemovalTime. newInitialCPBRemovalDelayOffset is used in the following to denote the interpolated temporal offset. As described above, the temporal raster may be derivable from the data stream 14 in form of temporal differences between a removal of the first access unit and the removal of each of the subsequent access units such as a difference for each subsequent AU, measuring the time between a removal of this AU and the removal of the first AU (of the current buffer period).

The apparatus of FIG. 3 removes, however, the access units from the coded picture buffer 200 access unit wise using the temporal raster. Due to the fact that the feeding has been preponed by the temporal removal delay, the removal of the first access unit happens, in fact, at this temporal removal delay. The decoder 100 receives the removed access units, decodes them and outputs the decoded/reconstructed pictures.

In order to obtain the interpolated values, the apparatus of FIG. 3 does the following. It extracts from the bit stream 14 first CPB parameters $300_{i-1}$ relating to a first operation point $OP_{i-1}$ and second CPB parameters $300_i$ relating to a second operation point $OP_i$, wherein each of the first and second CPB parameters is indicative of a CPB size, a predetermined temporal offset, a predetermined temporal removal delay and a predetermined bitrate, wherein the CPB parameters $300_{i-1}$ and $300_i$ are for different predetermined bitrates. The apparatus then determines the interpolated temporal offset by interpolating, at the selected bitrate 302, between the predetermined temporal offset indicated by the first CPB parameters $300_{i-1}$ and the predetermined temporal offset indicated by the second CPB parameters $300_i$ and it determines the interpolated temporal removal delay by interpolating, at the selected bitrate 302, between the predetermined temporal removal delay indicated by the first CPB parameters $300_{i-1}$ and the predetermined temporal removal delay indicated by the second CPB parameters $300_i$. Later on, specific embodiments are described, which indicate, for instance, that the interpolation may be a linear interpolation. That is, the apparatus of FIG. 3 may linearly interpolate between the predetermined temporal offset indicated by the CPB parameters $300_{i-1}$ and $300_i$ and linearly interpolate between the predetermined temporal removal delay as indicated by these neighboring CPB parameters. However, different sorts of interpolation may alternatively be used. It may even be that the encoder decides on one or more interpolation parameters to parametrize the interpolation and sends the one or more interpolation parameters in the data stream with the apparatus of FIG. 3 deriving this information from the data stream 14 and performing the interpolation accordingly. The way of interpolation may be the same for temporal offset and temporal removal delay. Further, additionally, the apparatus of FIG. 3 may also interpolate, at the selected bit rate 302, between the CPB size as indicated by the first CPB parameters $300_{i-1}$ and the CPB size as indicated by the second CPB parameters $300_i$ so as to obtain an interpolated CPB size and the apparatus of FIG. 3 may rely on the fact that this interpolated CPB size for CPB 200 suffices to accommodate any occurring fullness state when feeding and emptying the coded picture buffer 200 using the interpolated values for temporal removal delay and temporal offset. As said, the encoder makes sure that this promise holds. For instance, the encoder may restrict the promise to the decoding side for a certain discrete set of intermediate bitrates between bitrates bitrate(i−1) and bitrate(i) such as in units of tenths or another fraction of the interval between these bitrates. The encoder may then test whether any overflow or underflow situation occurs and, if yes, adapt any of the values accordingly. For instance, if an overflow occurs, the encoder may increase one of the CPB sizes indicated by operation point $OP_i$ and $OP_{i-1}$, respectively. Alternatively, the encoder may resume the whole encoding of the bitstream again along with a determination of CPB parameters and the check of conflict-freeness of the interpolated values.

In other words, in accordance with an embodiment, the encoder may make sure that a weighted linear combination of two of the indicated discrete InitialCPBRemovalDelayOffset values can be computed and used as a newInitialCPBRemovalDelayOffset for computing the earliest arrival time, such that the HRD limits (for CPB size and Bitrate) that are computed when the CPB and Bitrate curves are fitted from the corresponding indicated discrete values, lead to a valid decoder operation. As discussed, the curve fitting of the CPB size and Bitrate curves can be:
  Linear
  Cubic
  Polynomial That is, encoder and decoder may use other interpolations than a piecewise linear interpolation between the operation points' $OP_i$ values and, in particular, between their values InitCpbRemovalDelayOffset$_i$ for the temporal offset.

According to an embodiment, the encoder may indicate the weights ($a_0$ and $a_1$ below) to be used for interpolation, i.e. newInitialCPBRemovalDelayOffset=

$a_0$*InitCpbRemovalDelayOffset$_0$+
  $a_1$*InitCpbRemovalDelayOffset$_1$

As a further alternative, instead of signalling $a_0$ and $a_1$ as in the previous equation, two other weight ($\beta_0$ and $\beta_1$) are provided that together with the selected rate ($R_{sel}$) allow computing the actually used ($a_0$ and $a_1$).

$a_0$ being equal to $\beta_0/R_{sel}$ and $a_1$ equal to $\beta_1/R_{sel}$

As a further alternative the weights provided ($\beta_0$ and $\beta_1$) may be equal to bitrates for discrete operation points and the computed $a_0$ and $a_1$ are scaled by the normalized distance between the selected rate $R_{sel}$ and the provided bitrates as HRD parameters $R_0$ and $R_1$, respectively. That is, the interpolation may be newInitialCPBRemovalDelayOffset=

$(R_{sel}-R_0)/(R_1-R_0)*(R_0/R_{sel})$*InitCpbRemovalDelayOffset$_0$+$(1-(R_{sel}-R_0)/(R_1-R_0))*(R_1/R_{sel})$*InitCpbRemovalDelayOffset$_1$ wherein $R_0$ and $R_1$ are the bitrates of operations points $OP_0$ and $OP_1$ for which the CPB parameters $300_0$ and $300_1$ indicate as temporal offset InitCpbRemovalDelayOffset$_0$ and InitCpbRemovalDelayOffset$_1$ respectively, and the selected rate is $R_{sel}$. That is, here the interpolation is performed by weighting InitCpbRemovalDelayOffset$_0$ with $(R_{sel}-R_0)/(R_1-R_0)*(R_0/R_{sel})$ and InitCpbRemovalDelayOffset$_1$ with $(1-(R_{sel}-R_0)/(R_1-R_0))*(R_1/R_{sel})$, i.e. using a product of two ratios.

Again the encoder makes sure that the provided bitstream and indication not only applies to the discrete operation points given but also to the values that can be computed in between. In order to do so an encoder may sample different values in between the given the discrete values and make sure that for such values there is no buffer underflow or overflow.

One embodiment of the bitstream is conveying the described weights in the form of bitrates $R_0$ and $R_1$ in order to compute the intermediate initial removal offset. A bitstream processing device such as or involving a video decoder on client-side receiving a bitstream produced by an encoder as described above will have to rely on the fact that the encoder produced the bitstream in a way that satisfies the above time constraints. The device may run a check on the bitstream to ensure that it is in fact a legal bitstream and such a check can be part of the regular decoding process. The check may include parsing the respective bitstream syntax that conveys the CPB and timing information such as the initial removal offsets, deriving directly associated variables and further variables through their respective equations and monitoring that the values of said variables in order to obey the level limits over time as indicated in other syntax of the bitstream (such as the level indicator). Furthermore, a system consisting of an encoder and decoder may include steps of checking said bitstream characteristics.

Figure 6:
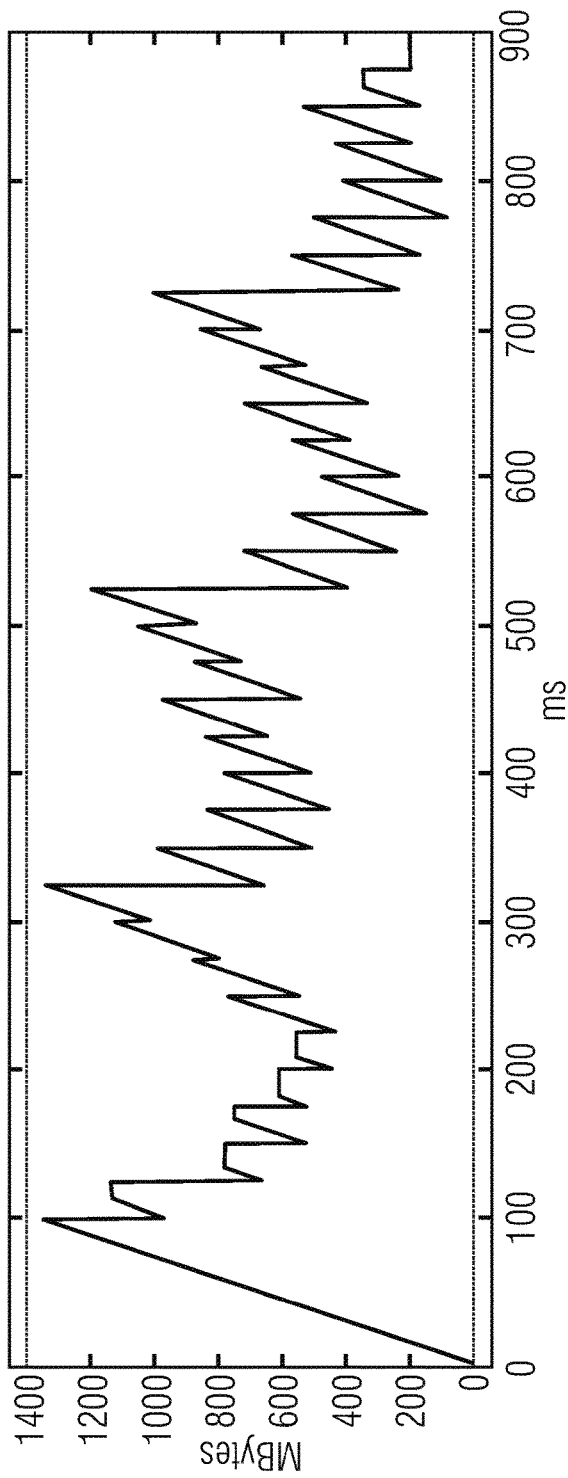
FIGS. 6 to 14 show a CPB buffer fill state for different examples of settings for CPB parameter bitrates, selected bitrate therebetween and the temporal offset.
Figure 7:
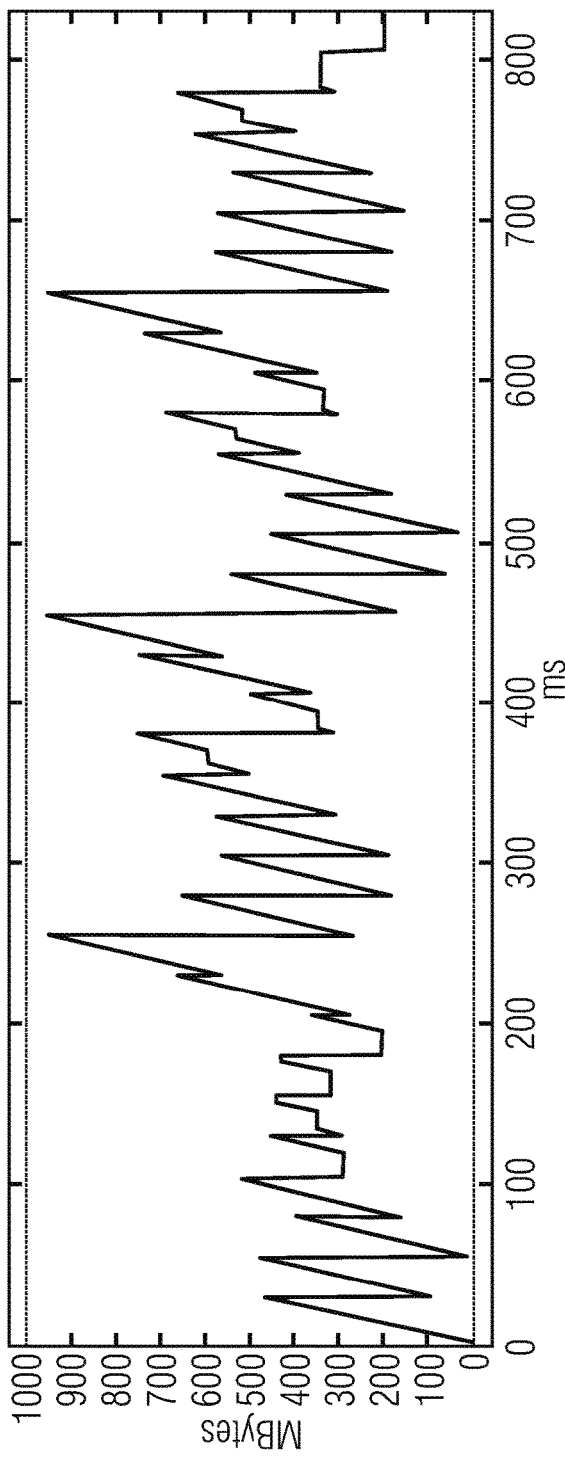

FIGS. 6 and 7 show the CPB buffer fill level for two operation points with $R_0$ and $R_1$ being equal to 13.5 and 16 Mbps respectively. The CPB sizes $CPB_0$ and $CPB_1$ are respectively 1400 and 1000 Megabytes. And the offsets described above, i.e. InitCpbRemovalDelayOffset$_0$ and InitCpbRemovalDelayOffset$_1$ are 30 and 0 milliseconds, respectively.

Figure 8:
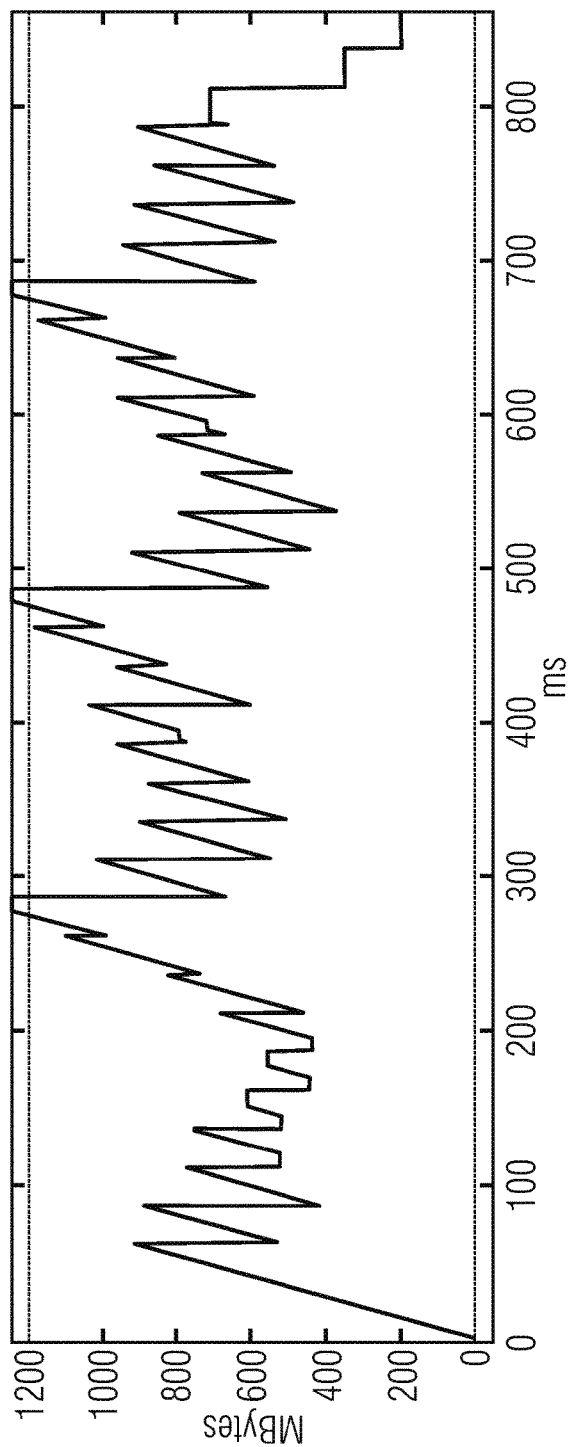
Figure 9:
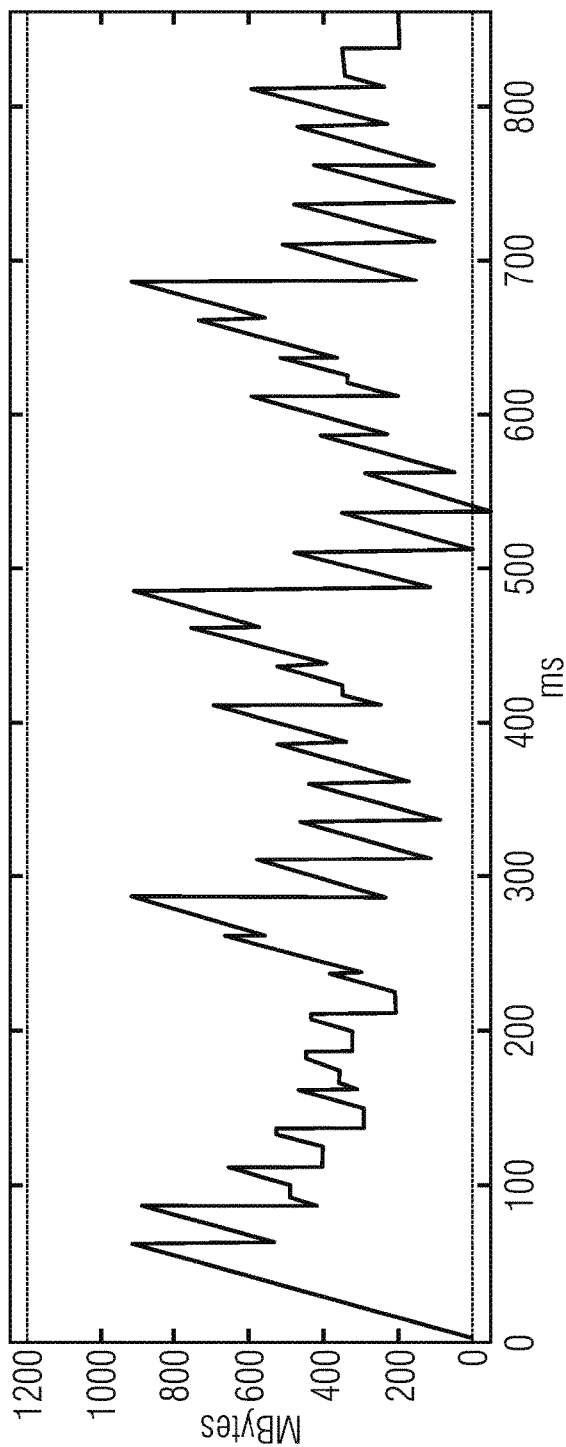
Figure 10:
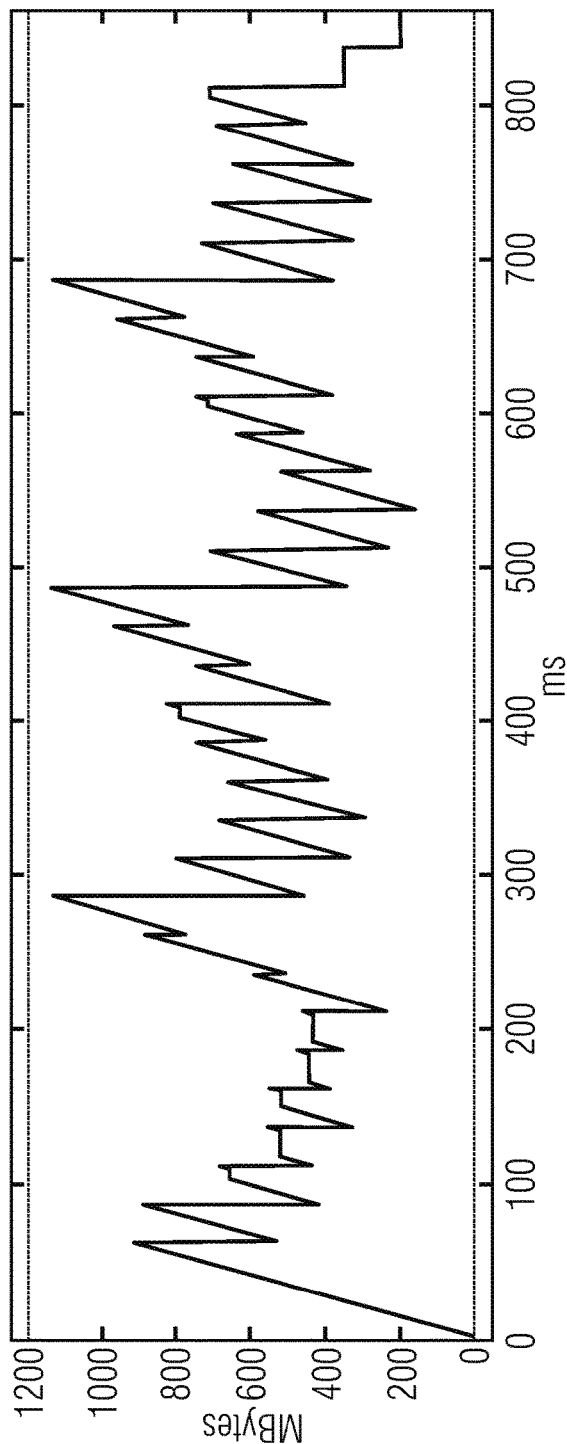
Figure 11:
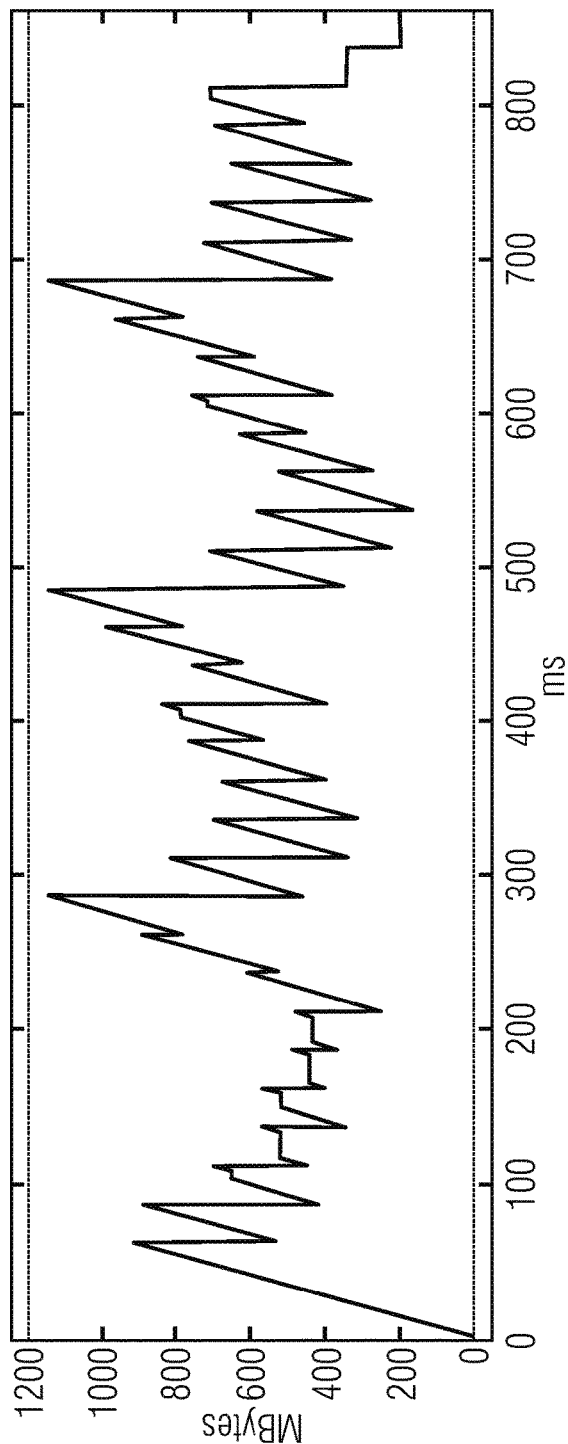
Figure 12:
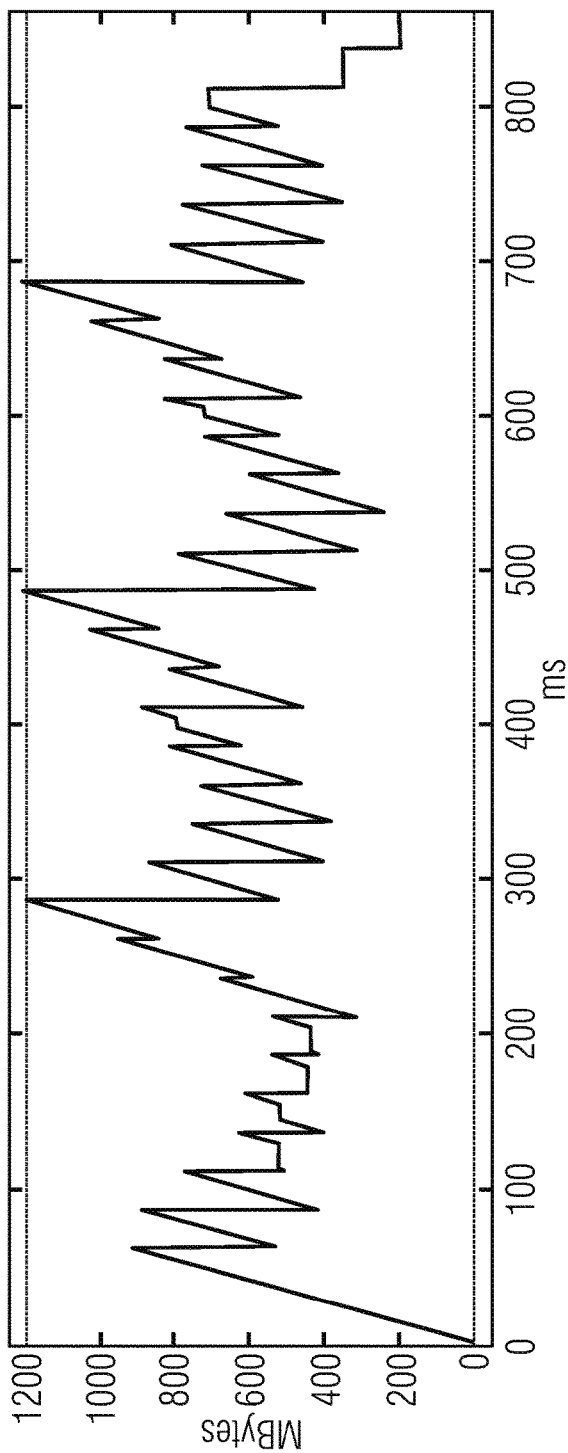
Figure 13:
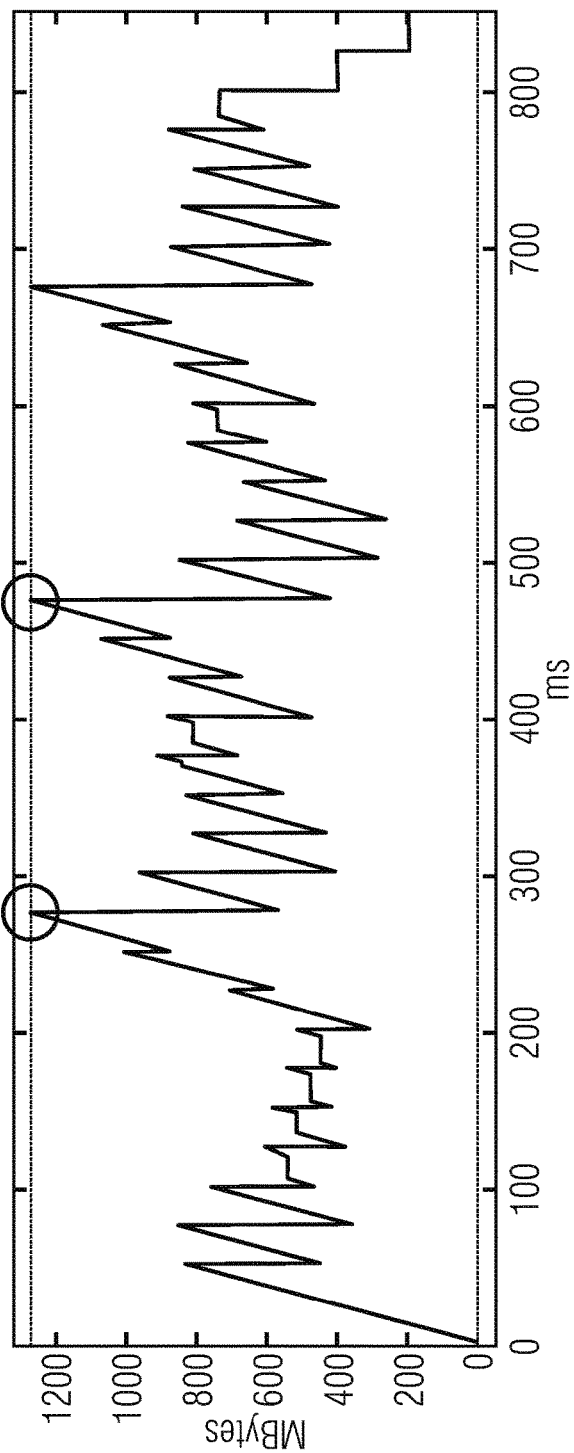
Figure 14:
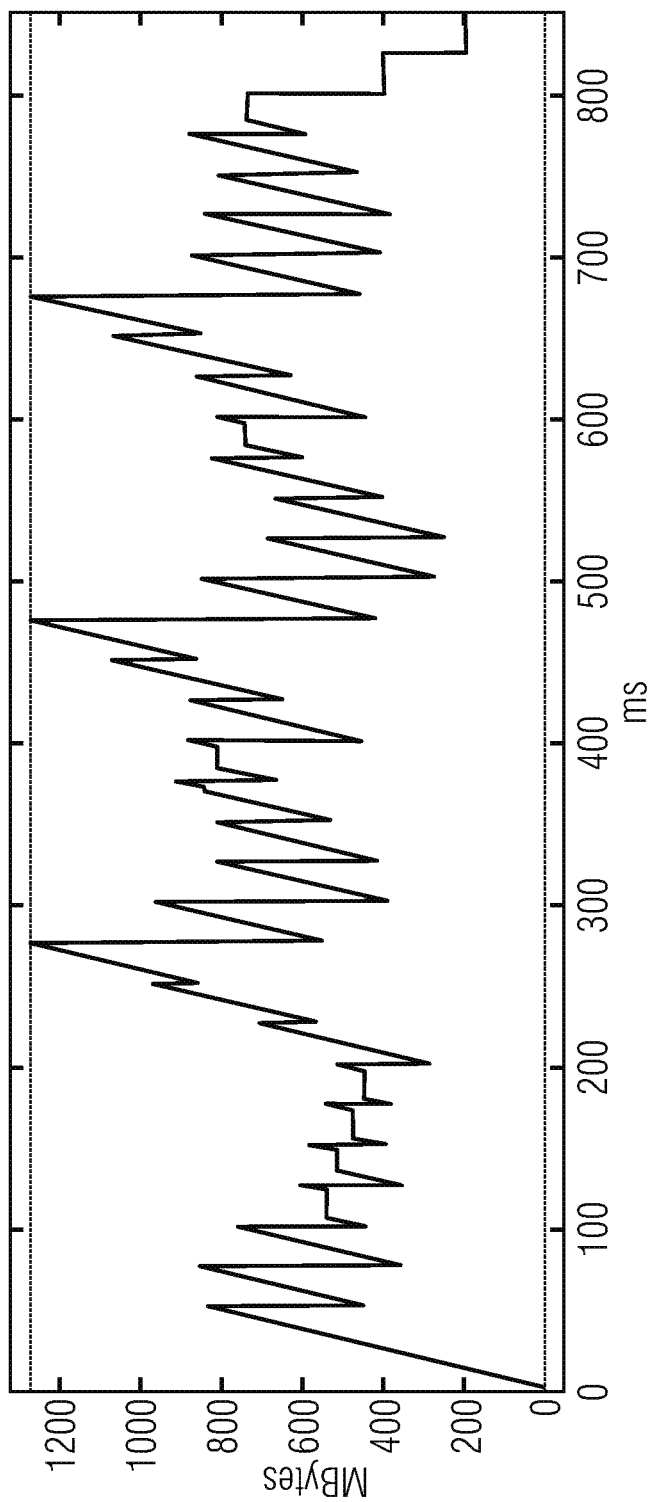

The following figures show the CPB fullness for a value of $R_{sel}$ equal to 14.75 Mbps (i.e. exactly in between 13.5 and 16 Mbps) and different values of newInitialCPBRemovalDelayOffset. In FIG. 8, the latter is equal to InitCpbRemovalDelayOffset$_0$ (30 ms), resulting in an overflow, while in FIG. 9, same is equal to InitCpbRemovalDelayOffset$_1$ (0 ms), resulting in an underflow. When just using linear fitting of the given operation points InitCpbRemovalDelayOffset$_0$ and InitCpbRemovalDelayOffset$_1$ (15 ms), the situation of FIG. 10 results. Using the computed value as discussed above (16.3 ms), the situation of FIG. 11 results. FIG. 12 illustrates using an arbitrary value between InitCpbRemovalDelayOffset$_0$ and InitCpbRemovalDelayOffset$_1$ (20 ms), also resulting into an overflow. As can be seen, an arbitrary number of an offset equal to InitCpbRemovalDelayOffset$_0$ and InitCpbRemovalDelayOffset$_1$ might lead to problems, i.e. buffer underflows or overflows. In the example above, linear fitting leads to a valid operation value, as well as the provided explicit weighting provisioning discussed above. However, in other cases linear fitting might lead to overflow (if the encoder does not take care). For instance, linear fitting for the case with $R_0$ and $R_1$ being equal to 14.5 and 18 Mbps and $CPB_0$ and $CPB_1$ being respectively 1250 and 1300 Megabytes and with $InitCpbRemovalDelayOffset_0$ and $InitCpbRemovalDelayOffset_1$ equal to 15 and 40 respectively, is depicted in FIG. 13. Here overflows result. In FIG. 14 the interpolation using the interpolation with the two-factor weights is shown.

The decoder 100 of FIG. 3 reconstructs, from each inbound AU, the corresponding picture 16', wherein possible, but optional, implementation details which may apply individually or in combination, have been described above with respect to FIG. 2. Some options for the implementation of decoder and encoder are described in more details below.

A first one relates to the handling of decoded pictures 16' and their buffering a decoded picture buffer. The loop buffer 142 of FIG. 2 may include such DPB. In FIG. 3, the DPB may be part of decoder 100.

According to an embodiment, the apparatus of FIG. 3 distinguishes between two types of reference pictures, short-term and long-term. The encoder does the same in emulating the DPB fill state of the decoder 100 at each point in time during decoding. A reference picture may be marked as "unused for reference" when it becomes no longer needed for prediction reference. The conversion among these three statuses (short-term, long-term, and unused for reference) is controlled by a decoded reference picture marking process. There are two alternative decoded reference picture marking mechanisms, the implicit sliding window process and the explicit memory management control operation (MMCO) process. For each currently decoded picture or each currently decoded AU, it is signalled in the data stream 14 as to which process shall be used for DPB management. The sliding window process marks a short-term reference picture as "unused for reference" when the number of reference frames is equal to a given maximum number (max-num-ref-frames in SPS). The short-term reference pictures are stored in a first-in, first-out manner so that the most recently decoded short-term pictures are kept in the DPB. The explicit MMCO process is controlled via multiple MMCO commands. If this mode is selected for a current AU or currently decoded picture, the bitstream contains for this, or in this, AU one or more of these commands. An MMCO command may any of 1) mark one or more short-term or long-term reference picture as "unused for reference," 2) mark all the pictures as "unused for reference," or 3) mark the current reference picture or an existing short-term reference picture as long-term, and assign a long-term picture index to that long-term picture. The reference picture marking operations as well as any output—for sake of presentation—and removal of pictures from the DPB may be performed after a picture has been decoded.

That is, reverting to FIG. 3, according to an embodiment, the decoder 100 may decode 400 a current AU 402 removed from, and thus received from, the CPB 200 to obtain a decoded picture 16'. It may use inter-picture prediction based on a referenced reference picture 404 stored in the afore-mentioned DPB 406 which be comprised by the afore-mentioned loop buffer 142. The decoded picture 16' may by inserted 408 into the DPB 406. The insertion 408 may be performed for each currently decoded picture 16', i.e. each decoded picture may, after its decoding 400, be placed in the DPB 406. The insertion 408 may take place instantaneously, i.e. at the AU's 402 CPB removal time when neglecting decoding time, or CPB removal time plus decoding time needed. The insertion 408 may, however, additionally be made dependent on certain facts as indicated at 410, such as each newly decoded picture being inserted into the DPB 406 unless it is to be output 412 at its CPB removal time, i.e. unless it is an immediate output picture, i.e. a picture to be immediately output for presentation, and it is a non-reference picture which circumstance might be indicated in the corresponding AU 402 by way of a corresponding syntax element. To each reference picture 414 stored in the DPB 406, the apparatus may assign a classification as one of a short-term reference picture, a long-term reference picture and an unused-for-reference picture. The apparatus further reads DPB mode information 416 from the current AU 402, and if the mode information 416 indicates an inherent or first mode, an inherent DPB management process 418 is activated and removes 424 one or more reference pictures 414 which are classified as a short-term picture, according to a FIFO strategy, from the DPB 406. If the mode information 416 indicates an explicit or second mode, an explicit DPB management process 420 is activated and executes one or more commands contained in memory management control information comprised by the current AU 402 so as to change the classification assigned to at least one of the reference pictures 414 stored in the DPB 406, and uses the classification of the reference pictures 414 in the DPB 406 for managing reference picture removal 424 from the DPB 406. Irrespective of the process 418 and 420 being selected for the current picture 16', any picture 414 in the DPB 406 whose picture output time is reached, is output 422 for presentation. Pictures 414 no longer to be output and classified as unused-for-reference are removed 424 from the DPB 406.

Figure 15:
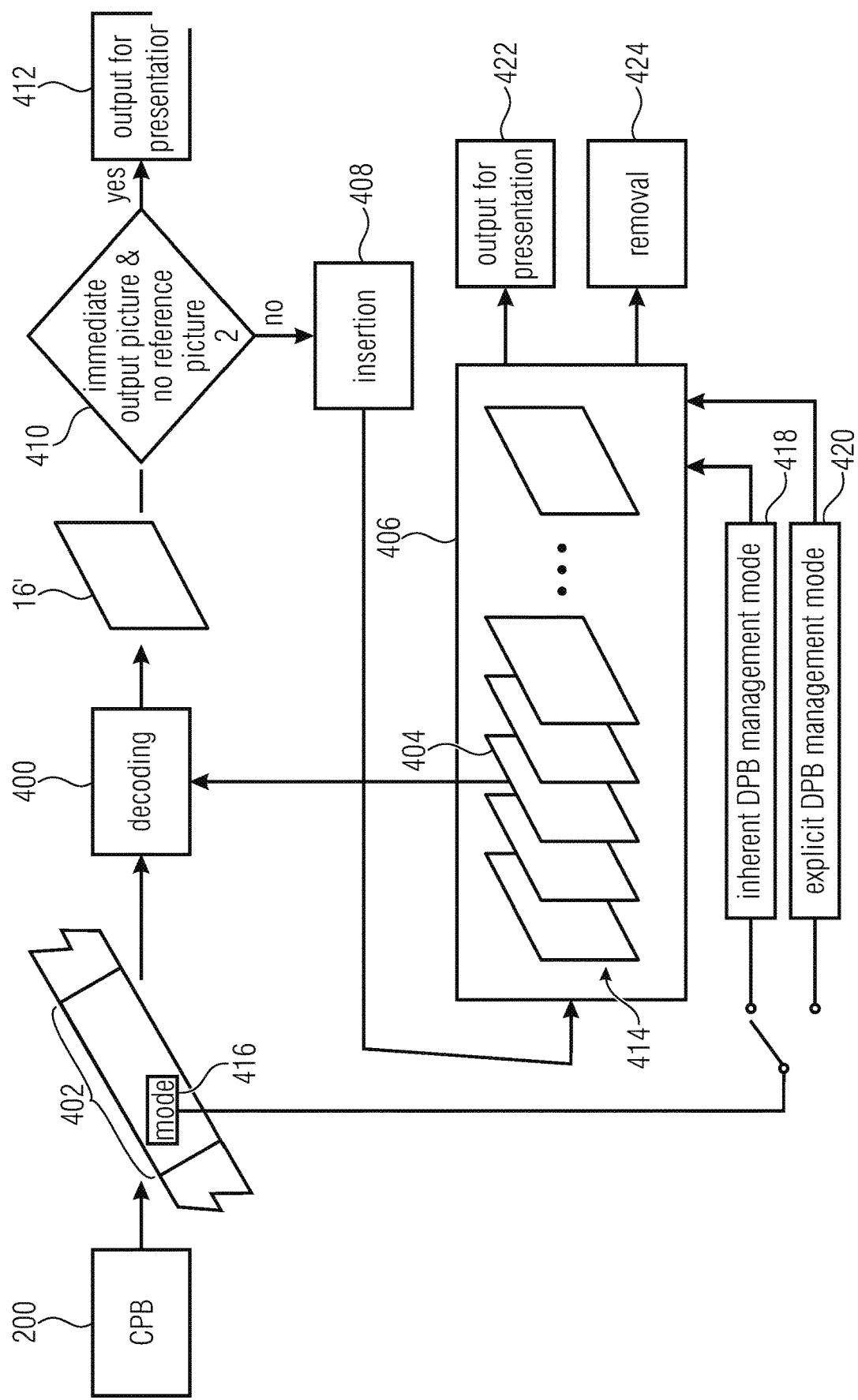
FIG. 15 shows a schematic diagram of an example of a mode of operation of the apparatus of FIG. 3 for managing a DPB.

Some possible details of the reference picture marking mechanism of FIG. 15 are discussed below. 1) A first aspect relates to gaps in frame number and non-Existing pictures. Although not explained above, it might be that each reference picture 414 in the DPB 406 is associated with a frame number, which might be derived by the apparatus of FIG. 3 from a frame number syntax element in the AU 402, which indicates the AUs rank in the decoding order. Normally this number increases by one for each reference picture 414, but gaps in frame number may be allowed by setting a corresponding high level (such as sequence level) flag, which might be called parameter-gaps-in-frame-num-allowed-flag, to one for example in order to allow that an encoder or a MANE (media aware network element) can deliver a bitstream in which the frame numbers increase by more than one for a reference picture relative to the preceding reference picture in decoding order. This might be favourable in order to support temporal scalability. The apparatus of FIG. 3, receiving a sequence of AUs with gaps in the frame numbers, might be configured to create non-existing pictures to fill the gap. The non-existing pictures are assigned with frame number values in the gap and are considered as reference pictures during decoded reference picture marking, but will not be used for output (hence not displayed). The non-existing pictures ensure that the status of the DPB, with respect to the frame numbers of the pictures residing in it, is the same for a decoder that received the pictures as for a decoder that did not receive the pictures.

Another possible aspect relates to the loss of a reference picture when using sliding Window. When a reference picture is lost, the apparatus of FIG. 3 can try to conceal the picture and possibly report the loss to the encoder if a feedback channel is available given that the loss is detected. If gaps in frame number are disallowed, a discontinuity in the frame number values indicates an unintentional loss of a reference picture. If gaps in frame number are allowed, a discontinuity in frame number values may be caused by either intentional removal of temporal layers or subsequences or an accidental picture loss, and decoders such as the apparatus of FIG. 3 should infer a picture loss only if a non-existing picture is referred in the inter prediction process. The picture order count of a concealed picture may not be known which can cause the decoder such as the apparatus of FIG. 3 to use incorrect reference pictures without detecting any errors when decoding B-pictures.

An even further possible aspect relates to the loss of a reference picture with MMCO. When losing a reference picture that contains an MMCO command marking a short-term reference picture as "unused for reference," then the status of reference pictures in the DPB becomes incorrect and consequently, reference picture lists for a few pictures following the lost picture may become incorrect. If a picture containing MMCO commands related to long-term reference pictures is lost there is a risk that the number of long-term reference pictures in the DPB is different from what it would have been if the picture was received, resulting in an "incorrect" sliding window process for all the following pictures. That is, the encoder and decoder, i.e. the apparatus of FIG. 3, will contain a different number of short-term reference pictures resulting in out-of-sync behaviour of the sliding window process. What makes the situation even worse is that a decoder will not necessarily know that the sliding window process is out-of-sync.

Possible MMCO commands mentioned above are shown in the following figure. One or more or all of the commands may apply to yield in different embodiments:

| memory_management_control_operation | Memory Management Control Operation |
|---|---|
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximmum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it |

A further option for the implementation of decoder and encoder is described now, may optionally be combined with the one concerning the DPB management described before, and relates to entropy decoding of some syntax element such as the residual data in form of transform coefficients into the bitstream 14. Lossless entropy coding of lossy quantized transform coefficients is a crucial part of an efficient video codec. One such method is referred to as context-adaptive-variable-length-coding (CAVLC) in which the encoder switches between different variable length code (VLC) tables for various syntax elements, depending on the values of the previously transmitted syntax elements in the same slice in a context-adaptive fashion. Encoder and decoder may use the CAVLC. Due to the fact that each syntax element is coded into the bitstream 14 by writing a corresponding codeword into the bitstream which has been selected for that syntax element from the context-adaptively selected code table, each CAVLC encoded bit in the bitstream can be associated to a single syntax element. The relevant information about the transform coefficient levels in scan order to be present in bitstream 14 is, thus, available in a direct accessible form as syntax elements when CAVLC is used. Encoder and decoder may use CAVLC to signal the transform coefficients in the bitstream 14. The following syntax elements may be used, i.e. syntax elements having the following semantics:

- One syntax element indicating the total number of non-zero transform coefficient levels in a transform block (as indicated by CoeffToken)
- One or more syntax elements indicating the number of trailing one transform coefficient levels, i.e. a run of syntax elements occurring at the end of scanning the syntax elements in a scan order up to the last non-zero syntax element which are all one, and their sign
- One or more syntax element per non-zero transform coefficient except the trailing one transform coefficients, which indicates the transform coefficient level value
- One syntax element indicating the total number of zero-valued transform coefficient levels
- Syntax elements indicting the number of consecutive transform coefficient levels in scan order with zero value from a current scan position onwards before a non-zero valued transform coefficient level is encountered.

It might alternatively or additionally be that the encoder might select between the usage of CABAC, thus context-adaptive binary arithmetic coding, and CAVLC and signal the selection in the bitstream 14 and that the decoder reads this signal and uses the indicated way of decoding the residual data.

A further option for the implementation of decoder and encoder is described now, may optionally be combined with any of the one concerning the DPB management and the one concerning CAVLC described before, and relates to a quarter pel interpolation filter. In order to allow inter-prediction at a finer granularity than the regular full-pel sample grid, a sample interpolation process is used to derive sample values at sub-pel sample positions which can range from half-pel positions to quarter-pel position. One method to carry out quarter-pel interpolation may be used by encoder and decoder and is as follows. First, a 6-tap FIR filter is used to generate sample values at half-pel positions followed by an averaging of the generated half-pel position sample values through interpolation to generate sample values at quarter-pel position for luma components.

Figure 16:
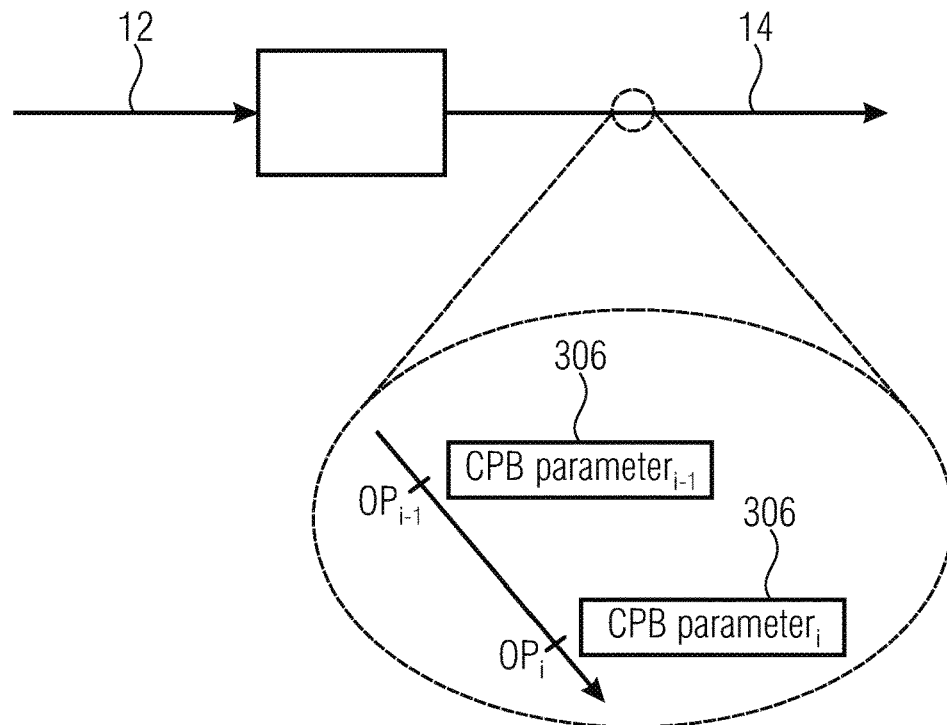
FIG. 16 shows a block diagram of an apparatus for encoding according to an embodiment of the present application.

For sake of completeness, FIG. 16 shows an encoder fitting to the apparatus of FIG. 3, i.e. one which encodes a video 12 into bitstream14, possibly but not necessarily according to FIG. 1, and which provides the bitstream 14 with the CPB parameters 300 in a manner so that an interpolation as to be done by apparatus of FIG. 3 yields underflow and overflow free operation.

Thus, the following embodiments or aspects are derivable from the above description, and the following embodiments or aspects, in turn, are further extendible by any of the above details and facts, individually or in combination.

In accordance with a first aspect, an apparatus for video decoding may comprise a coded picture buffer 200, and be configured to receive a data stream 14 having pictures 16 of a video 12 encoded thereinto along a coding order as a sequence of access units 48, feed the sequence of access units 48 sequentially into the CPB using a selected bitrate 302 with halting the feeding with respect to access units for which a virtual time of availability according to a temporal frame removal raster preponed by, for a first access unit in the coding order, a selected temporal removal delay and, for subsequent access units in coding order, a sum of the selected temporal removal delay and a selected temporal offset has not yet been reached, until the virtual time of availability is reached; remove the AUs from the CPB AU-wise using the temporal raster [RemovalTime], extract from the data stream first CPB parameters $300_{i-1}$ relating to a first operation point and second CPB parameters $300_i$ relating to a second operation point, each of the first and the second CPB parameters being indicative of a CPB size, a predetermined temporal offset, a predetermined temporal removal delay and a predetermined bitrate, wherein the first CPB parameters $300_{i-1}$ differ from the second CPB parameters $300_i$ at least with respect to the predetermined bitrate, determine the selected temporal offset by interpolating, at the selected bitrate, between the predetermined temporal offset indicated by the first CPB parameters $300_{i-1}$ and the predetermined temporal offset indicated by the second CPB parameters $300_i$ and the selected temporal removal delay by interpolating, at the selected bitrate, between the predetermined temporal removal delay indicated by the first CPB parameters $300_{i-1}$ and the predetermined temporal removal delay indicated by the second CPB parameters $300_i$.

In accordance with a second aspect when referring back to the first aspect, the apparatus may be configured to derive from the data stream one or more interpolation parameters and parametrize the interpolation using the one or more interpolation parameters.

In accordance with a third aspect when referring back to the first or second aspect, the apparatus may be configured to perform the interpolating using a weighted sum of the predetermined temporal offset indicated by the first CPB parameters, weighted by a first weight, and the predetermined temporal offset indicated by the second CPB parameters, weighted by a second weight.

In accordance with a fourth aspect when referring back to the third aspect, the apparatus may be configured to determine the first and second weights based on the selected bitrate, the predetermined bitrate indicated by the first CPB parameters, and the predetermined bitrate indicated by the second CPB parameters.

In accordance with a fifth aspect when referring back to the third aspect, the apparatus may be configured to compute a linear interpolation weight by dividing a difference between the selected bitrate and the predetermined bitrate indicated by the first CPB parameters by a difference between the predetermined bitrate indicated by the first CPB parameters and the predetermined bitrate indicated by the second CPB parameters, And determine the first and second weights using the linear interpolation weight.

In accordance with a sixth aspect when referring back to the fifth aspect, the apparatus may be configured to determine the first weight so that the first weight is the linear interpolation weight or a product one factor of which is the linear interpolation weight, and determine the second weight so that the second weight is a difference between the linear interpolation weight and one or a product one factor of which is the difference between the linear interpolation weight and one.

In accordance with a seventh aspect when referring back to the fifth aspect, the apparatus may be configured to determine the first weight so that the first weight is a product a first factor of which is the linear interpolation weight, and a second factor of which is the predetermined bitrate indicated by the first CPB parameters divided by the selected bitrate, and determine the second weight so that the second weight is a product one factor of which is the difference between the linear interpolation weight and one, and a second factor of which is the predetermined bitrate indicated by the second CPB parameters divided by the selected bitrate.

In accordance with an eighth aspect when referring back to any of the first to seventh aspects, the apparatus may further comprise a decoded picture buffer (DPB) and be configured to decode a current AU 402 removed from the CPB 406 using inter-picture prediction from a referenced reference picture 404 stored in the DPB to obtain a decoded picture 16', and insert 408 the decoded picture into the DPB, assign to each reference picture 414 stored in the DPB a classification as one of a short-term reference picture, a long-term reference picture and an unused-for-reference picture, read DPB mode information 416 from the current AU, if the DPB mode information indicates a first mode, remove 424 one or more reference pictures classified as a short-term picture, according to a FIFO strategy, from the DPB, if the DPB mode information indicates a second mode, read memory management control information comprising at least one command in the current AU and execute the at least one command so as to change the classification assigned to at least one of the reference pictures stored in the DPB, and use the classification of the reference pictures in the DPB, for managing reference picture removal 424 from the DPB.

In accordance with a ninth aspect when referring back to the eighth aspect, the apparatus may be configured to read from the current AU an indication whether the decoded picture is not used for inter-picture prediction; perform the insertion of the decoded picture into the DPB, if the decoded picture is not indicated to be not used for inter-picture prediction or not directly to be output, and directly output the decoded picture without buffering same in the DPB, if the decoded picture is indicated to be not used for inter-picture prediction and directly to be output.

In accordance with a tenth aspect when referring back to the eighth or ninth aspect, the apparatus may be configured to assign a frame index to each reference picture in the DPB, classified to be a long-term picture, and use a predetermined reference picture in the DPB, classified to be a long-term picture, as the referenced reference picture in the DPB if the frame index assigned to the predetermined reference picture is referred to in the current AU.

In accordance with an eleventh aspect when referring back to the tenth aspect, the apparatus may be configured to one or more of: if the at least one command in the current AU is a first command, re-classify a reference picture in the DPB, classified to be a short-term reference picture, as an unused-for-reference picture, if the at least one command in the current AU is a second command, re-classify a reference picture in the DPB, classified to be a long-term reference picture, as an unused-for-reference picture, if the at least one command in the current AU is a third command, re-classify a reference picture in the DPB, classified to be a short-term picture, as a long-term reference picture, and assign a frame index to the re-classified reference picture, if the at least one command in the current AU is a fourth command, set an upper frame index limit according to the fourth command, and re-classify all reference picture in the DPB, classified to be a long-term picture, and having assigned thereto a frame index exceeding the upper frame index limit, as an unusedfor-reference picture, if the at least one command in the current AU is a fifth command, classify the current picture as a long-term picture, and assign a frame index to the current reference picture.

In accordance with a twelfth aspect when referring back to any of the eighth to eleventh aspects, the apparatus may be configured to remove any reference picture from the DPB, which is classified as an unused-for-reference picture, and which is no longer to be output.

In accordance with a thirteenth aspect when referring back to any of the first to twelfth aspects, the apparatus may be configured to read an entropy coding mode indicator from the data stream, and decode prediction residual data from the current AU using a context adaptive variable length coding mode if the entropy coding mode indicator indicates the context adaptive variable length coding mode, and using a context adaptive binary arithmetic coding mode if the entropy coding mode indicator indicates the context adaptive binary arithmetic coding mode.

In accordance with a fourteenth aspect when referring back to any of the first to thirteenth aspects, the apparatus may be configured to derive quarter pel values in the referenced reference picture based on a motion vector in the current AU and using 6-tap FIR filter so as to derive half-pel values and averaging neighboring half-pel values.

In accordance with a fifteenth aspect when referring back to any of the first to fourteenth aspects, the apparatus may be configured to derive from the data stream information on the temporal raster by means of temporal differences between a removal of the first access unit and the removal of each of the subsequent access units.

In accordance with a sixteenth aspect when referring back to any of the first to fifteenth aspects, the apparatus may be configured to interpolate, at the selected bit rate 302, between the CPB size as indicated by the first CPB parameters 300$_{i-1}$ and the CPB size as indicated by the second CPB parameters 300$_i$ so as to obtain an interpolated CPB size so as to determine a minimum CPB size for the coded picture buffer 200.

In accordance with a seventeenth aspect when referring back to any of the first to sixteenth aspects, in the apparatus, the selected bitrate may be between the predetermined bitrate indicated by the first CPB parameters 300$_{i-1}$ and the predetermined bitrate indicated by the second CPB parameters 300$_i$.

In accordance with an eighteenth aspect when referring back to any of the first to seventeenth aspects, the apparatus may be configured to operate in units of buffering periods with the first access unit in the coding order being the first access unit of a current buffering period.

In accordance with a nineteenth aspect, an apparatus for encoding a video into a data stream wherein the data stream is ought to be decoded by being fed to a decoder comprising a coded picture buffer (CPB), may be configured to encode, into a data stream, pictures of a video encoded in a coding order as a sequence of access units (AU), determine first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate, and perform the determining such that interpolating between the predetermined temporal offset of the first CPB parameters and the predetermined temporal offset of second CPB parameters at each of a plurality of selected bitrates yields an interpolated temporal offset and an interpolated temporal removal delay so that feeding the data stream to the decoder via the CPB by feed the sequence of AUs sequentially into the CPB using the respective selected bitrate with halting the feeding with respect to access units for which a virtual time of availability according to a temporal frame removal raster preponed by, for a first access unit in the coding order, an interpolated temporal removal delay and, for subsequent access units in coding order, a sum of the interpolated temporal removal delay and an interpolated temporal offset has not yet been reached, until the virtual time of availability is reached; remove the AUs from the CPB AU-wise using the temporal raster, does not lead to any underflow and any overflow, and encode the CPB parameters into the data stream.

In accordance with a twentieth aspect when referring back to the nineteenth aspect, in the apparatus, the interpolating may be parametrized using interpolation parameters, and the apparatus may be configured to encode, into the data stream, the interpolation parameters.

In accordance with a twenty-first aspect when referring back to the nineteenth or twentieth aspect, in the apparatus, the interpolating is to be performed using a weighted sum of the predetermined temporal offset indicated by the first CPB parameters, weighted by a first weight, and the predetermined temporal offset indicated by the second CPB parameters, weighted by a second weight.

In accordance with a twenty-second aspect when referring back to the twenty-first aspect, in the apparatus the first and second weights are determined based on the selected bitrate, the predetermined bitrate indicated by the first CPB parameters, and the predetermined bitrate indicated by the second CPB parameters.

In accordance with a twenty-third aspect when referring back to the twenty-first aspect, in the apparatus, a linear interpolation weight which is determined by dividing a difference between the selected bitrate and the predetermined bitrate indicated by the first CPB parameters by a difference between the predetermined bitrate indicated by the first CPB parameters and the predetermined bitrate indicated by the second CPB parameters, may be used to determine the first and second weights.

In accordance with a twenty-fourth aspect when referring back to the twenty-third aspect, in the apparatus, the first weight may be determined so that the first weight is the linear interpolation weight or a product one factor of which is the linear interpolation weight, and the second weight may be determined so that the second weight is a difference between the linear interpolation weight and one or a product one factor of which is the difference between the linear interpolation weight and one.

In accordance with a twenty-fifth aspect when referring back to the twenty-third aspect, in the apparatus, the first weight may be determined so that the first weight is a product a first factor of which is the linear interpolation weight, and a second factor of which is the predetermined bitrate indicated by the first CPB parameters divided by the selected bitrate, and the second weight may be determined so that the second weight is a product one factor of which is the difference between the linear interpolation weight and one, and a second factor of which is the predetermined bitrate indicated by the second CPB parameters divided by the selected bitrate.

In accordance with a twenty-sixth aspect when referring back to any of the nineteenth to twenty-fifth aspects, the apparatus may be configured to, in encoding the AUs, encode a current picture using inter-picture prediction from a referenced reference picture stored in a DPB into a current AU, and insert a decoded version of the current picture in the DPB into the DPB, assign to each reference picture stored in the DPB a classification as one of a short-term reference picture, a long-term reference picture and an unused-for-reference picture, write DPB mode information into the current AU, if the DPB mode information indicates a first mode, remove one or more reference pictures classified as a short-term picture, according to a FIFO strategy, from the DPB, if the DPB mode information indicates a second mode, write memory management control information comprising at least one command into the current AU, the command being instructive to change the classification assigned to at least one of the reference pictures stored in the DPB, wherein the classification of the reference pictures in the DPB, is used for managing reference picture removal from the DPB.

In accordance with a twenty-seventh aspect when referring back to the twenty-sixth aspect, the apparatus may be configured to write into the current AU an indication whether the decoded picture is not used for inter-picture prediction; wherein the decoded picture is to be inserted into the DPB, if the decoded picture is not indicated to be not used for inter-picture prediction or not directly to be output, and the decoded picture is to be directly output without buffering same in the DPB, if the decoded picture is indicated to be not used for inter-picture prediction and directly to be output.

In accordance with a twenty-eighth aspect when referring back to the twenty-sixth or twenty-seventh aspect, in the apparatus, a frame index is to be assigned to each reference picture in the DPB, classified to be a long-term picture, and a predetermined reference picture in the DPB, classified to be a long-term picture, is to be used as the referenced reference picture in the DPB if the frame index assigned to the predetermined reference picture is referred to in the current AU.

In accordance with a twenty-ninth aspect when referring back to the twenty-eighth aspect, in the apparatus, one or more of: if the at least one command in the current AU is a first command, a reference picture in the DPB, classified to be a short-term reference picture, is to be re-classified as an unused-for-reference picture, if the at least one command in the current AU is a second command, a reference picture in the DPB, classified to be a long-term reference picture, is to be re-classified as an unused-for-reference picture, if the at least one command in the current AU is a third command, a reference picture in the DPB, classified to be a short-term picture, is to be re-classified as a long-term reference picture, and a frame index is to be assigned to the re-classified reference picture, if the at least one command in the current AU is a fourth command, an upper frame index limit is to be set according to the fourth command, and all reference picture in the DPB, classified to be a long-term picture, and having assigned thereto a frame index exceeding the upper frame index limit, are to be re-classified as an unused-for-reference picture, if the at least one command in the current AU is a fifth command, the current picture is to be classified as a long-term picture, and assign a frame index to the current reference picture.

In accordance with a thirtieth aspect when referring back to any of the twenty-sixth to twenty-ninth aspects, in the apparatus, any reference picture, which is classified as an unused-for-reference picture, and which is no longer to be output, is to be removed from the DPB.

In accordance with a thirty-first aspect when referring back to any of the nineteenth to thirtieth aspects, the apparatus may be configured to write an entropy coding mode indicator into the data stream, encode prediction residual data into the current AU using a context adaptive variable length coding mode if the entropy coding mode indicator indicates the context adaptive variable length coding mode, and using a context adaptive binary arithmetic coding mode if the entropy coding mode indicator indicates the context adaptive binary arithmetic coding mode.

In accordance with a thirty-second aspect when referring back to any of the nineteenth to thirty-first aspects, the apparatus may be configured to derive quarter pel values in the referenced reference picture based on a motion vector in the current AU and using 6-tap FIR filter so as to derive half-pel values and averaging neighboring half-pel values.

In accordance with a thirty-third aspect when referring back to any of the nineteenth to thirty-second aspects, the apparatus may be configured to provide the data stream with information on the temporal raster by means of temporal differences between a removal of the first access unit and the removal of each of the subsequent access units.

In accordance with a thirty-fourth aspect when referring back to any of the nineteenth to thirty-third aspects, in the apparatus, at the selected bit rate $302$, an interpolation between the CPB size as indicated by the first CPB parameters $300_{i-1}$ and the CPB size as indicated by the second CPB parameters $300_i$ is to be performed so as to obtain an interpolated CPB size so as to determine a minimum CPB size for the coded picture buffer $200$.

In accordance with a thirty-fifth aspect when referring back to any of the nineteenth to thirty-fourth aspects, in the apparatus, the selected bitrate may be between the predetermined temporal offset indicated by the first CPB parameters $300_{i-1}$ and the predetermined temporal offset indicated by the second CPB parameters $300_i$.

In accordance with a thirty-sixth aspect when referring back to any of the nineteenth to thirty-fifth aspects, the apparatus may be configured to operate in units of buffering periods with the first access unit in the coding order being the first access unit of a current buffering period.

In accordance with a thirty-seventh aspect when referring back to any of the nineteenth to thirty-sixth aspects, the apparatus may be configured to perform the determination by determining a preliminary version of the first CPB parameters and the second CPB parameters; performing the interpolation at the plurality of selected bitrates so as to obtain the interpolated temporal offset and the interpolated temporal removal delay for each of the plurality of selected bitrates; and checking, for each of the plurality of selected bitrates, whether feeding the data stream to the decoder via the CPB using the interpolated temporal offset and the interpolated temporal removal delay obtained for the respective selected bitrate leads to underflow and overflow, and, if yes, resume the encoding in a different manner, amend the preliminary version of the first CPB parameters and the second CPB parameters, or resume the interpolation using a different manner, and if not, determine the first CPB parameters and the second CPB parameters to be equal to the preliminary version.

In accordance with a thirty-eighth aspect, a method for video decoding by use of a coded picture buffer $200$ may have the steps of: receiving a data stream $14$ having pictures $16$ of a video $12$ encoded thereinto along a coding order as a sequence of access units $48$, feeding the sequence of access units $48$ sequentially into the CPB using a selected bitrate $302$ with halting the feeding with respect to access units for which a virtual time of availability according to a temporal frame removal raster preponed by, for a first access unit in the coding order, a selected temporal removal delay and, for subsequent access units in coding order, a sum of the selected temporal removal delay and a selected temporal offset has not yet been reached, until the virtual time of availability is reached; removing the AUs from the CPB AU-wise using the temporal raster [RemovalTime], extracting from the data stream first CPB parameters $300_{i-1}$ relating to a first operation point and second CPB parameters $300_i$ relating to a second operation point, each of the first and the second CPB parameters being indicative of a CPB size, a predetermined temporal offset, a predetermined temporal removal delay and a predetermined bitrate, wherein the first CPB parameters $300_{i-1}$ differ from the second CPB parameters $300_i$ at least with respect to the predetermined bitrate, determining the selected temporal offset by interpolating, at the selected bitrate, between the predetermined temporal offset indicated by the first CPB parameters $300_{i-1}$ and the predetermined temporal offset indicated by the second CPB parameters $300_i$ and the selected temporal removal delay by interpolating, at the selected bitrate, between the predetermined temporal removal delay indicated by the first CPB parameters $300_{i-1}$ and the predetermined temporal removal delay indicated by the second CPB parameters $300_i$.

A thirty-ninth aspect may have a data stream into which video may be encoded and which may comprise first and second CPB parameters so that the method of the thirty-eighth aspect leads to no CPB overflow and underflow.

In accordance with a fortieth aspect, a method for encoding a video into a data stream wherein the data stream is ought to be decoded by being fed to a decoder comprising a coded picture buffer (CPB), may have the steps of: encoding, into a data stream, pictures of a video encoded in a coding order as a sequence of access units (AU), determining first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate, and perform the determining such that interpolating between the predetermined temporal offset of the first CPB parameters and the predetermined temporal offset of second CPB parameters at each of a plurality of selected bitrates yields an interpolated temporal offset and an interpolated temporal removal delay so that feeding the data stream to the decoder via the CPB by feeding the sequence of AUs sequentially into the CPB using the respective selected bitrate with halting the feeding with respect to access units for which a virtual time of availability according to a temporal frame removal raster preponed by, for a first access unit in the coding order, an interpolated temporal removal delay and, for subsequent access units in coding order, a sum of the interpolated temporal removal delay and an interpolated temporal offset has not yet been reached, until the virtual time of availability is reached; removing the AUs from the CPB AU-wise using the temporal raster, does not lead to any underflow and any overflow, and A forty-first aspect may have a data stream generated by the method of the fortieth aspect.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCE

[1] From Sjoberg, Rickard, et al. "Overview of HEVC high-level syntax and reference picture management." IEEE transactions on Circuits and Systems for Video Technology 22.12 (2012): 1858-1870.

The invention claimed is:

1. A non-transitory computer readable storage medium storing instructions which, when executed on a computer, carry out a method for video decoding by use of a coded picture buffer (CPB) and a decoded picture buffer (DPB), the method comprising
receiving a data stream having pictures of a video encoded thereinto along a coding order as a sequence of access units (AU),
feeding the sequence of access units sequentially into the CPB using a selected bitrate with halting the feeding with respect to access units for which a virtual time of availability according to a temporal frame removal raster preponed by, for a first access unit in the coding order, a selected temporal removal delay and, for subsequent access units in coding order, a sum of the selected temporal removal delay and a selected temporal offset has not yet been reached, until the virtual time of availability is reached;
removing the AUs from the CPB AU-wise using the temporal raster,
extracting from the data stream first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate,
determining the selected temporal offset by interpolating, at the selected bitrate, between the predetermined temporal offset indicated by the first CPB parameters and the predetermined temporal offset indicated by the second CPB parameters and the selected temporal removal delay by interpolating, at the selected bitrate, between the predetermined temporal removal delay indicated by the first CPB parameters and the predetermined temporal removal delay indicated by the second CPB parameters, and
reading an entropy coding mode indicator from the data stream, and
decoding prediction residual data from a current AU using a context adaptive variable length coding mode if the entropy coding mode indicator indicates the context adaptive variable length coding mode, and using a context adaptive binary arithmetic coding mode if the entropy coding mode indicator indicates the context adaptive binary arithmetic coding mode,
wherein the decoding the prediction residual data from the current AU using the context adaptive variable length coding mode comprises using
a first syntax element indicating a total number of non-zero transform coefficient levels in a transform block,
a second syntax element indicating a total number of zero-valued transform coefficient levels in the transform block,
third syntax elements indicting a number of consecutive transform coefficient levels in a scan order with zero value from a current scan position onwards before a non-zero transform coefficient level is encountered,
one or more fourth syntax elements for each non-zero valued transform coefficient except trailing one transform coefficients, which one or more fourth syntax elements indicate a transform coefficient level value of the respective non-zero valued transform coefficient, and
one or more fifth syntax elements indicating a sign of the trailing one transform coefficient levels.

2. The non-transitory computer readable storage medium of claim 1, configured to
derive from the data stream one or more interpolation parameters and parametrize the interpolation using the one or more interpolation parameters.

3. The non-transitory computer readable storage medium of claim 1, the method comprising
performing the interpolating using a weighted sum of the predetermined temporal offset indicated by the first CPB parameters, weighted by a first weight, and the predetermined temporal offset indicated by the second CPB parameters, weighted by a second weight.

4. The non-transitory computer readable storage medium of claim 3, to the method comprising
determining the first and second weights based on the selected bitrate, the predetermined bitrate indicated by the first CPB parameters, and the predetermined bitrate indicated by the second CPB parameters.

5. The non-transitory computer readable storage medium of claim 3, the method comprising
computing a linear interpolation weight by dividing a difference between the selected bitrate and the predetermined bitrate indicated by the first CPB parameters by a difference between the predetermined bitrate indicated by the first CPB parameters and the predetermined bitrate indicated by the second CPB parameters; and determining the first and second weights using the linear interpolation weight.

6. The non-transitory computer readable storage medium of claim 5, to the method comprising determining the first weight so that the first weight is the linear interpolation weight or a product one factor of which is the linear interpolation weight, and determining the second weight so that the second weight is a difference between the linear interpolation weight and one or a product one factor of which is the difference between the linear interpolation weight and one.

7. The non-transitory computer readable storage medium of claim 5, to the method comprising determining the first weight so that the first weight is a product a first factor of which is the linear interpolation weight, and a second factor of which is the predetermined bitrate indicated by the first CPB parameters divided by the selected bitrate, and determining the second weight so that the second weight is a product one factor of which is the difference between the linear interpolation weight and one, and a second factor of which is the predetermined bitrate indicated by the second CPB parameters divided by the selected bitrate.

8. A non-transitory computer readable storage medium storing instructions which, when executed on a computer, carry out a method for encoding a video into a data stream wherein the data stream is ought to be decoded by being fed to a decoder comprising a coded picture buffer (CPB), the method comprising encoding pictures of a video into a data stream in a coding order as a sequence of access units (AU), determining first CPB parameters relating to a first operation point and second CPB parameters relating to a second operation point, each of the first and the second CPB parameters being indicative of a CPB size, a predetermined temporal offset, a predetermined temporal removal delay and a predetermined bitrate, wherein the first CPB parameters differ from the second CPB parameters at least with respect to the predetermined bitrate, and perform the determining such that interpolating between the predetermined temporal offset of the first CPB parameters and the predetermined temporal offset of second CPB parameters at each of a plurality of selected bitrates yields an interpolated temporal offset and an interpolated temporal removal delay so that feeding the data stream to the decoder via the CPB by feeding the sequence of AUs sequentially into the CPB using the respective selected bitrate with halting the feeding with respect to access units for which a virtual time of availability according to a temporal frame removal raster preponed by, for a first access unit in the coding order, an interpolated temporal removal delay and, for subsequent access units in coding order, a sum of the interpolated temporal removal delay and an interpolated temporal offset has not yet been reached, until the virtual time of availability is reached; and removing the AUs from the CPB AU-wise using the temporal raster, does not lead to any underflow and any overflow, and encoding the CPB parameters into the data stream, encoding an entropy coding mode indicator into the data stream, so that the entropy coding mode indicator indicates a context adaptive variable length coding mode or a context adaptive binary arithmetic coding mode and encoding prediction residual data into a current AU using the context adaptive variable length coding mode if the entropy coding mode indicator indicates the context adaptive variable length coding mode, and using the context adaptive binary arithmetic coding mode if the entropy coding mode indicator indicates the context adaptive binary arithmetic coding mode, wherein the encoding the prediction residual data into the current AU using the context adaptive variable length coding mode comprises using a first syntax element indicating a total number of non-zero transform coefficient levels in a transform block, a second syntax element indicating a total number of zero-valued transform coefficient levels in the transform block, third syntax elements indicting a number of consecutive transform coefficient levels in a scan order with zero value from a current scan position onwards before a non-zero transform coefficient level is encountered, one or more fourth syntax elements for each non-zero valued transform coefficient except trailing one transform coefficients, which one or more fourth syntax elements indicate a transform coefficient level value of the respective non-zero valued transform coefficient, and one or more fifth syntax elements indicating a sign of the trailing one transform coefficient levels.

9. The non-transitory computer readable storage medium of claim 8, wherein the interpolating is parametrized using interpolation parameters, and the method comprises encoding, into the data stream, the interpolation parameters.

10. The non-transitory computer readable storage medium of claim 8, wherein the interpolating is to be performed using a weighted sum of the predetermined temporal offset indicated by the first CPB parameters, weighted by a first weight, and the predetermined temporal offset indicated by the second CPB parameters, weighted by a second weight.

11. The non-transitory computer readable storage medium of claim 10, wherein the first and second weights are determined based on the selected bitrate, the predetermined bitrate indicated by the first CPB parameters, and the predetermined bitrate indicated by the second CPB parameters.

12. The non-transitory computer readable storage medium of claim 10, wherein a linear interpolation weight which is determined by dividing a difference between the selected bitrate and the predetermined bitrate indicated by the first CPB parameters by a difference between the predetermined bitrate indicated by the first CPB parameters and the predetermined bitrate indicated by the second CPB parameters, is used to determine the first and second weights.

13. The non-transitory computer readable storage medium of claim 12, wherein the first weight is determined so that the first weight is the linear interpolation weight or a product one factor of which is the linear interpolation weight, and the second weight is determined so that the second weight is a difference between the linear interpolation weight and one or a product one factor of which is the difference between the linear interpolation weight and one.

14. The non-transitory computer readable storage medium of claim 12, wherein the first weight is determined so that the first weight is a product a first factor of which is the linear interpolation weight, and a second factor of which is the predetermined bitrate indicated by the first CPB parameters divided by the selected bitrate, and the second weight is determined so that the second weight is a product one factor of which is the difference between the linear interpolation weight and one, and a second factor of which is the predetermined bitrate indicated by the second CPB parameters divided by the selected bitrate.

* * * * *